(12) United States Patent
Sakayori

(10) Patent No.: US 8,742,059 B2
(45) Date of Patent: *Jun. 3, 2014

(54) POLYMER PRECURSOR, HIGH TRANSPARENCY POLYIMIDE PRECURSOR, POLYMER COMPOUND, RESIN COMPOSITION AND ARTICLE USING THEREOF

(75) Inventor: Katsuya Sakayori, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/307,578

(22) Filed: Nov. 30, 2011

(65) Prior Publication Data

US 2012/0122033 A1    May 17, 2012

Related U.S. Application Data

(62) Division of application No. 11/391,093, filed on Mar. 28, 2006, now Pat. No. 8,088,882.

(30) Foreign Application Priority Data

Mar. 31, 2005  (JP) ................... 2005-105138
Mar. 3, 2006   (JP) ................... 2006-057230

(51) Int. Cl.
    *C08G 69/08*    (2006.01)
(52) U.S. Cl.
    USPC ......... 528/310; 428/847.1; 525/125; 525/126
(58) Field of Classification Search
    USPC ........ 428/847.1; 528/125, 126, 335; 549/273; 560/212, 204
    See application file for complete search history.

(56) References Cited

U.S. PATENT DOCUMENTS

| 2,772,972 | A |  | 12/1956 | Herrick, Jr. et al. |  |
| 2,797,213 | A |  | 6/1957 | Moore |  |
| 3,669,658 | A |  | 6/1972 | Yonezawa et al. |  |
| 5,024,922 | A | * | 6/1991 | Moss et al. | 430/330 |
| 5,972,807 | A |  | 10/1999 | Tani et al. |  |
| 6,252,033 | B1 |  | 6/2001 | Kweon et al. |  |
| 6,333,392 | B1 | * | 12/2001 | Asao et al. | 528/170 |
| 8,088,882 | B2 | * | 1/2012 | Sakayori | 528/310 |
| 2003/0148128 | A1 |  | 8/2003 | Tomaru et al. |  |

FOREIGN PATENT DOCUMENTS

| JP | 56-052722 A | 5/1981 |
| JP | 60-221403 A | 11/1985 |
| JP | 03-273216 A | 12/1991 |
| JP | 3-275725 A | 12/1991 |
| JP | 05-001148 A | 1/1993 |
| JP | 06-041205 A | 2/1994 |
| JP | 6-329799 A | 11/1994 |
| JP | 10-310639 A | 11/1998 |
| JP | 11-140181 A | 5/1999 |
| JP | 2002-060489 A | 2/2002 |

OTHER PUBLICATIONS

USPTO OA mailed May 2, 2007 in connection with U.S. Appl. No. 11/391,093.
USPTO NFOA mailed Jan. 2, 2008 in connection with U.S. Appl. No. 11/391,093.
USPTO FOA mailed Aug. 12, 2008 in connection with U.S. Appl. No. 11/391,093.
USPTO NFOA mailed Apr. 13, 2009 in connection with U.S. Appl. No. 11/391,093.
USPTO FOA mailed Nov. 4, 2009 in connection with U.S. Appl. No. 11/391,093.
USPTO NFOA mailed Jul. 16, 2010 in connection with U.S. Appl. No. 11/391,093.
USPTO FOA mailed Jan. 5, 2011 in connection with U.S. Appl. No. 11/391,093.
USPTO Notice of Allowablity mailed Aug. 30, 2011 in connection with U.S. Appl. No. 11/391,093.
USPTO OA mailed Apr. 30, 2008 in connection with U.S. Appl. No. 11/093,783.
USPTO FOA mailed Feb. 2, 2009 in connection with U.S. Appl. No. 11/093,783.
USPTO NFOA mailed Aug. 25, 2009 in connection with U.S. Appl. No. 11/093,783.
USPTO FOA mailed May 19, 2010 in connection with U.S. Appl. No. 11/093,783.
John A Kreuz; "Hydrolyses of Polyamic-Acid Solutions", J. of Polymer Sici, 28 Issue 13, pp. 3787-3793 (1990).
Katsuya Sakayor, et al; "Synthesis and Properties of Poly(amis acid)s and Polimides Based on 2,2', 6,6'-Biphenyltetracarboxylic Dianhydride", Journal of Polymer Science: Part A: Polymer Chemistry, vol. 44, 6385-6393, Received Jun. 5, 2006; accepted Aug. 9, 2006 DOI:10.1002/pola.21737; Published online in Wiley InterScience (www.interscience.wiley.com).
Insuke Ouchi, et al; *Partial English Translation* of the boxed text in Article No. IIPF166 of Polymer Preprints, Japan 48 (5), p. 939, 1999.
O.K. Goins et al; "Synthesis of a Novel Polyimide and Related Compounds", Journal of Polymer Science Part B: Polymer Letters, vol. 6, Issue 11, pp. 821-825 Published Online: Mar. 10, 2003.
John A. Kreuz; "Hydrolyses of polyamic-acid solution", J. of Polymer Science, vol. 28, Issue 13, pp. 3787-3793 (1990).

* cited by examiner

*Primary Examiner* — Gregory Listvoyb
(74) *Attorney, Agent, or Firm* — Ladas & Parry LLP

(57) ABSTRACT

A polymer precursor including a part which sequences an unsaturated bond having a π electron orbit and a single bond alternately is disclosed. The polymer precursor has a first functional group and a second functional group which form a repeating unit constituting a polymer skeleton of an end product by an intramolecular reaction. At least a part of a conjugated state formed by the π electron orbit in the molecule is disconnected or weakened due to a three-dimensional structure of the molecule and a transmittance with respect to an electromagnetic wave of at least one wavelength selected from the group consisting of 436 nm, 405 nm, 365 nm, 248 nm and 193 nm is improved.

4 Claims, 5 Drawing Sheets

Result of MM2 calculation

Polyimide 1

Polyimide 3

POLYMER PRECURSOR, HIGH TRANSPARENCY POLYIMIDE PRECURSOR, POLYMER COMPOUND, RESIN COMPOSITION AND ARTICLE USING THEREOF

BACKGROUND OF THE INVENTION

1. Field of the Invention

The present invention relates to a polymer precursor excellent in transparency with respect town electromagnetic wave in an ultraviolet range. Particularly, the present invention relates to a polymer precursor, a polymer compound derived from the polymer precursor and a resin composition containing the polymer precursor which can be suitably utilized as material of a product or member formed through a patterning process by an electromagnetic wave, for instance, a forming material of optical goods or optical parts, an insulating material, a layer forming material or an adhesive or the like, and an article produced with the use of the polymer precursor, the polymer compound or the resin composition.

Suitably, the present invention relates to a polyimide precursor excellent in transparency with respect to an electromagnetic wave in an ultraviolet range. Particularly, the present invention relates to high transparency polyimide precursor which can be suitably utilized as material of a product or member formed through a patterning process by an electromagnetic wave, for instance, a forming material of optical goods or optical parts, an insulating material, a layer forming material or an adhesive or the like and is excellent in heat resistance and transparency after imidization. Further, the present invention relates to high transparency polyimide derived from the high transparency polyimide precursor, a resin composition containing the high transparency polyimide precursor and an article produced with the use of the high transparency polyimide precursor, the high transparency polyimide or the resin composition.

2. Description of the Related Art

Polymer material is used for various familiar products due to its properties such as high processability, lightness in weight or the like. Polyimide developed by DuPont, U.S., in 1955 has been further developed so as to apply to an aerospace field or the like because of its excellent heat resistance. Since then, in detailed studies done by many researchers, it was found that properties such as heat resistance, dimensional stability, insulating property and the like are good among organic matters showing top-class properties, hence, polyimide has been applied not only to the aerospace field but also to an insulating material of electronic parts and the like. Nowadays, polyimide is increasingly utilized as a chip coating layer of a semiconductor element, a substrate of a flexible printed-wiring board and the like.

Also, in recent years, in order to solve problems of the polyimide, compounds having a similar engineering process as the imidazole such as polybenzoxazole having low water absorption rate and low permittivity, polybenzimidazole excellent in adhesion property to a substrate and the like are vigorously researched.

Polyimide is a polymer which is synthesized from diamine and acid dianhydride. Precursor of polyimide (polyamic acid) is obtained by reacting diamine and acid dianhydride in liquid. Then, polyimide can be obtained through a dehydration and ring-closure reaction. Generally, since polyimide is poor in solubility to a solvent and difficult to process, polyimide is often obtained by making its precursor, which is polyamic acid, into a desired form followed by heating. Polyamic acid often decomposes by heat or water, thus, it is not good in storage stability. Taking the point into consideration, polyimide, which is improved in such a manner that a skeleton excellent in solubility is introduced to a molecular structure to obtain polyimide so as to be able to dissolve the polyimide into a solvent to form or apply, has been developed. However, this polyimide tends to be inferior in chemical resistance or adhesion to a substrate to the polyimide obtained by the means using a precursor. Hence, either means using a precursor or means using solvent-soluble polyimide is used in accordance with the purpose.

Also, with the advancement of technology, there has been demand for patterning polyimide in a desired form. Hence, polyimide which is capable of pattern forming through processes such as exposure, development and so on using an electromagnetic wave such as ultraviolet ray or the like has been developed. Several means are proposed for patterning polyimide. One of them is a method to obtain a pattern of polyimide in such a manner that patterning is performed in a state of polyimide precursor followed by imidization with thermal treatment or the like. Another method is to obtain a pattern in such a manner that a resist pattern is formed on polyimide itself by organic matters, metals or the like, opening of the resist pattern is treated with a solvent such as hydrazine, inorganic alkali, organic alkali or the like, an organic polar solvent or a mixture thereof to decompose or elute.

The former has an advantage that it is excellent in processability by using a precursor excellent in a solvent solubility. The latter has an advantage that an imidization process which requires a thermal treatment at high temperature or the like is not necessary after pattern forming. The former and the latter are used in accordance with required use thereof.

In the area of semiconductor which has been achieved remarkable development from the last half of the $20^{th}$ century, presently, polyimide of a type utilizing a precursor capable of patterning is mainly used since, as one reason, polyimide is formed on a silicon wafer substrate, the substrate can tolerate a thermal treatment of high temperature at 300° C. to 400° C. required for imidization.

As means for polyimide patterning of a type utilizing a precursor, various means are proposed. Representative means thereof can be classified broadly into the following two categories:

(1) a means in which a photosensitive resin layer is formed on a surface of a polyimide precursor and the polyimide precursor is patterned by a pattern of the photosensitive resin as the polyimide precursor itself does not have patterning ability; and (2) a means of pattern forming by an effect of introducing a photosensitive portion to a polyimide precursor itself by bonding or coordinating, a means of pattern forming by an effect of a photosensitive component in a resin composition which is a polyimide precursor mixed with the photosensitive component, and further, a means of a combination of introducing the photosensitive portion and mixing the photosensitive component.

As a representative means of the above (1) group, there is a means of obtaining a polyimide pattern in such a manner that utilizing solubility of polyamic acid, which is a polyimide precursor, to an alkali solvent, on a coating layer of the polyamic acid in the alkali solvent, a resist capable of an alkali development is applied followed by irradiation with an electromagnetic wave in a desired form; simultaneously as development of the resist, polyamic acid exposed from opening of the resist appeared by the development is also eluted in a developer to form a pattern; and then a resist layer on a surface is peeled by an organic solvent to which the polyamic acid is insoluble such as acetone or the like followed by imidization.

On the other hand, as a representative means of the above (2) group, the following means are proposed:

(a) a means of obtaining a polyimide pattern in such a manner that pattern forming is performed by mixing polyamic acid, which is a precursor of polyimide, with a naphthoquinonediazide derivative, which functions as a dissolution inhibitor before exposure of an electromagnetic wave and as a dissolution promoter after exposure to produce carboxylic acids, so as to enlarge contrast of dissolution rate of an exposed part and that of an unexposed part with respect to a developer; and imidization is performed;

(b) a means of obtaining a polyimide pattern in such a manner that pattern forming is performed by mixing polyamic acid, which is a precursor of polyimide, with a compound which is a basic substance exhibiting catalytic activity of imidization by exposure of an electromagnetic wave such as a nifedipine derivative or the like followed by heating at an appropriate temperature after exposure so that an exposed part is subject to partial imidization due to the effect of the basic substance produced on the exposed part, and thereby lowering solubility of the exposed part with respect to a developer so as to enlarge contrast of dissolution rate of the exposed part and that of an unexposed part with respect to the developer; and imidization is performed completely;

(c) a means of obtaining a polyimide pattern in such a manner that pattern forming is performed by mixing a polyimide precursor having a skeleton having a radically polymerizable ethylenically unsaturated bond with a photoradical initiator so as to form a cross-linked structure on an exposed part to lower solubility with respect to a developer, and thereby enlarging contrast of dissolution rate of the exposed part and that of an unexposed part with respect to a developer; and imidization is performed;

(d) a means of obtaining a polyimide pattern in such a manner that pattern forming is performed by mixing polyamic acid as a polyimide precursor with a skeleton having a basic part and an radically polymerizable ethylenically unsaturated bond to be bonded ionically; mixing a photoradical initiator thereto to form a cross-linked structure at an exposed part so as to lower solubility with respect to a developer, and thereby enlarging contrast of dissolution rate of the exposed part and that of an unexposed part with respect to the developer; and imidization is performed; and (e) a means of obtaining a polyimide pattern in such a manner that pattern forming is performed by mixing polyamic acid as a precursor of polyimide with a photoacid (or photobase) generator and a crosslinking agent followed by exposure and heating to proceed crosslinking by the effect of acid (or base) generated by the exposure, and thereby lowering solubility with respect to a developer so as to enlarge contrast of dissolution rate of an exposed part and that of an unexposed part with respect to the developer; and imidization is performed.

The above-mentioned means of (1) group is characterized in that, though the process is more complicated, the degree of freedom of composition of the polyimide precursor to be used is high. Also, impurity other than polyimide is not contained in final polyimide since a photosensitive component or the like is not mixed, hence, the above-mentioned means of (1) group is high in reliability.

On the other hand, the means of (2) group is characterized in that since the polyimide precursor (or the polyimide precursor resin composition) itself has pattern forming ability, the resist layer used in the (1) group is not necessary, hence, process is largely simpler. However, if the polyimide precursor itself does not fully transmit the exposure wavelength, problems may be raised such as decline in sensitivity, not capable of forming a pattern and the like since the electromagnetic wave may not reach the photosensitive component. Therefore, it is necessary to select a skeleton high in transmittance with respect to the exposure wavelength.

In accordance with a demand of the market for forming a finer pattern, shorter exposure wavelength is used gradually shifting from 436 nm to 405 nm or 365 nm. The polyimide precursor used for the above-mentioned means is different in absorption wavelength according to the chemical structure. Generally, the polyimide precursor often has absorption from around 450 nm to the short wavelength side. Particularly, the tendency is strong in a polyimide precursor having many aromatic structures, a part of which or most part of which is in a conjugated state. Also, the polyimide precursor in which efforts are made to make the absorption smaller often has absorption in the wavelength of 400 nm or less. In order to correspond to the exposure at the wavelength of 365 nm or less being capable of a finer process, improvement of transmittance with respect to shorter wavelength has been studied.

Particularly, a polyimide precursor having an aromatic skeleton exhibiting high heat resistance and low coefficient of expansion tends to have absorption in longer wavelength range.

The reason of the absorption of the polyimide precursor is said to be charge transfer. Recently, it is reported that particularly charge transfer in a molecule is highly related to coloring (Polymer Preprints, Japan 48 [5] 939 (1999)). That is, a polyimide precursor which has absorption in shorter wavelength range can be formed by eliminating the charge transfer in the molecule. Based on this principle, as conventional means to shift absorption of the polyimide precursor to shorter wavelength, two major means are proposed.

One means is to shift absorption to shorter wavelength by introducing an aliphatic structure, particularly an alicyclic structure, to a polyimide precursor skeleton in which there are normally many aromatic skeletons to disconnect conjugation of $\pi$ electron in the skeleton so as to inhibit charge transfer in the skeleton. Particularly, it is disclosed to be effective to introduce an alicyclic skeleton to diamine which is a starting material (Polymer Preprints, Japan 48 [5] 939 (1999), and Japanese Patent Application Laid-Open (JP-A) No. Hei. 10-310639).

The other means is to provide transparency by introducing fluorine in a polyimide precursor skeleton so as to hinder charge transfer in an electronic state of the skeleton (JP-A No. Hei. 05-1148).

As for a polyimide precursor using 2,2',6,6'-biphenyltetracarboxylic dianhydride as an acid component, Goin et al., U.S., discloses in POLYMER LETTERS Vol. 6, p. 821-825 (1968) that after refining polyamic acid obtained by reacting 2,2',6,6'-biphenyltetracarboxylic dianhydride with 4,4'-diamino diphenyl ether in dimethylacetamide by reprecipitation using diethyl ether, polyamic acid liquid obtained by being dissolved again in dimethylacetamide is cast followed by heating gradually up to 300° C., and thus obtained polyimide. The thermally decomposing temperature of polyimide is merely disclosed herein, and other physical properties are not stated in detail.

Also, JP-A No. Sho. 56-52722 similarly discloses to utilize polyimide synthesized by using 2,2',6,6'-biphenyltetracarboxylic dianhydride and 4,4'-diamino diphenyl ether as a liquid crystal orientation layer, however, an ability to orient a liquid crystal is merely disclosed herein, and other physical properties are not disclosed.

In Example of JP-A No. Hei. 6-41205 polyimide using 2,2',6,6'-biphenyltetracarboxylic dianhydride is disclosed, however, the polyimide is used as a protective layer which prevents polymers from adhering to a polymerization container. It is mentioned about a primary coloring of the polymer produced in the polymerization container having the protective layer provided, however, physical properties of polyimide precursor are not stated at all.

JP-A No. Hei. 6-329799 discloses a method for producing a molded body of polyimide and 2,2',6,6'-biphenyltetracarboxylic dianhydride is mentioned as one representative example of a starting material, however, compound names are merely listed without actual synthesis examples, thus, no specific physical property can be learned.

JP-A No. Hei. 11-140181 discloses a method for producing polyimide microparticles and 2,2',6,6'-biphenyltetracarboxylic dianhydride is mentioned herein as a representative example of a starting material, however, compound names are merely listed without actual synthesis examples, thus, no specific physical property can be learned.

JP-A No. 2002-60489 discloses polyimide and an adhesive tape obtained using the same. 2,2',6,6'-biphenyltetracarboxylic dianhydride is also mentioned herein as a representative example of a starting material, however, compound names are merely listed without actual synthesis examples, thus, no specific physical property can be learned.

JP-A No. Hei. 3-275725 discloses a method for producing a photoconductive polymer. 2,2',6,6'-biphenyltetracarboxylic dianhydride is also mentioned herein as a representative example of a material, however, compound names are merely listed without actual synthesis example, thus, no specific physical property can be learned.

SUMMARY OF THE INVENTION

All of the above-mentioned conventional means for improving transparency of the polyimide precursor accordingly induce decrease in physical properties of polyimide to be finally obtained.

The first means has a problem that an alicyclic structure tends to be more easily oxidized than an aromatic structure, thus colored by oxidization when heated in air. Hence, it is recommended to heat polyimide having an alicyclic structure introduced under inert atmosphere. Also, the polyimide having an alicyclic structure introduced has a lower thermally decomposing temperature than the aromatic polyimide, thus, it is inferior in heat resistance. Further, in the case of raising the coefficient of linear thermal expansion and forming an interface with a substance having the small thermal expansion coefficient such as metal, metal oxide, silicon wafer or the like, a warpage may be generated or deterioration in adherence may be caused due to a heat history.

Also, in the case of using diamine having an alicyclic structure as a starting material, diamine having an alicyclic structure has higher basicity than aromatic diamine, thus, when a polymerization reaction is performed with acid dianhydride, a salt is formed with carboxylic acid of polyamic acid produced, thus, it becomes difficult to increase a molecule weight. Therefore, a sililation method (a method to sililate an amino group and then to polymerize with acid dianhydride) or the like is proposed, however, increase of one synthesis process causes increase in cost.

On the other hand, the second means has a problem that by introducing fluorine to polyimide, cost of a material rises leading to increase in cost. Also, introducing fluorine causes decrease in adhesion of an interface, thus it becomes easy to be peeled from a substrate. Also, solvent resistance declines, and the glass transition temperature also lowers. Further, as the coefficient of linear thermal expansion becomes larger, a warpage of a substrate or decrease in adhesion may be caused when forming is performed on a substrate having a small thermal expansion coefficient.

Also, conventionally, in polyamic acid, which is one kind of a polyimide precursor, if tetracarboxylic dianhydride being used is aromatic series, two carbonyl groups finally forming an imide bond are bonded to the same aromatic ring in a π conjugated state, an amide bond and the carboxylic acid are close in the state of polyimide precursor after reaction with diamine, and their binding positions with the aromatic ring is fixed. Since the reaction between acid anhydride and amine is a reversible reaction, in such a state, a reverse reaction is more likely to occur. Hence, a reverse reaction proceeds due to a long-term storage and heating so that a molecular chain breaks to lower molecular weight, or a reactive end generated by the reverse reaction reacts with various parts to cause gelation. Therefore, hypothermic or frozen storage is recommended for the polyimide precursor represented by polyamic acid and handling of the polyimide precursor has been a problem.

The present invention has been achieved in light of the above-stated conventional problems. An object of a polymer precursor of the present invention is to provide a polymer precursor which exhibits high transmittance to a shorter wavelength range with respect to an electromagnetic wave, though the polymer precursor has a part which sequences an unsaturated bond having a π electron orbit and a single bond alternately.

An object of a photosensitive resin composition of the present invention is to provide a photosensitive resin composition which is high in sensitivity and can be exposed by an electromagnetic wave of shorter wavelength using the polymer precursor having high transmittance to a short wavelength range with respect to an electromagnetic wave and/or having excellent storage stability.

Another object of the present invention is to provide various kinds of products or members made of a polymer compound derived from the polymer precursor or containing the polymer compound using the polymer precursor having high transmittance to a short wavelength range with respect to an electromagnetic wave and/or excellent storage stability.

An object of a polyimide precursor of the present invention is to provide a polyimide precursor which has high transmittance in a shorter wavelength range with respect to an electromagnetic wave without damaging original properties as polyimide such as heat resistance or the like of polyimide to be finally obtained.

An object of a photosensitive resin composition of the present invention is to provide a photosensitive resin composition which has high sensitivity and can be exposed by an electromagnetic wave of a shorter wavelength using the polyimide precursor having high transparency and/or excellent storage stability.

Another object of the present invention is to provide various kinds of products or members made of polyimide derived from the polyimide precursor or containing the polyimide using the polyimide precursor having high transmittance in a short wavelength range with respect to an electromagnetic wave and/or excellent storage stability.

The present invention solves at least one of the above objects.

A polymer precursor of the present invention to solve the aforementioned problems comprises a polymer containing a part which sequences an unsaturated bond having a π electron orbit and a single bond alternately, wherein the polymer precursor has a first functional group and a second functional group which form a repeating unit constituting a polymer skeleton of an end product by an intramolecular reaction, wherein at least a part of a conjugated state formed by the π electron orbit in the molecule is disconnected or weakened due to a three-dimensional structure of the molecule, and wherein a transmittance with respect to an electromagnetic wave of at least one wavelength selected from the group consisting of 436 nm, 405 nm, 365 nm, 248 nm and 193 nm is larger than an expected transmittance provided that the conjugated state is under neither disconnected condition nor weakened condition.

The polymer containing a part which sequences an unsaturated bond having a π electron orbit and a single bond alternately generally tends to have the conjugated state formed by the π electron orbit in the molecule. However, in the polymer precursor of the present invention, the conjugated state, which will be generally formed, is disconnected or weakened due to the three-dimensional structure in the molecule, thus, stabilization of the π electron orbit is inhibited. As a result, absorption in a long wavelength range vanishes or becomes smaller, hence, the polymer precursor exhibits high transmittance in a shorter wavelength range with respect to an electromagnetic wave.

As a preferable embodiment of the polymer precursor of the present invention, a polymer precursor, wherein the part which sequences an unsaturated bond having a π electron orbit and a single bond alternately has a first site and a second site which are different from each other, wherein the first functional group and the first site, and the second functional group and the second site are respectively bonded directly or via other atom, and wherein the conjugated state formed between the first site and the second site is disconnected or weakened due to the three-dimensional structure of the molecule, is provided.

In the case that the first functional group and the second functional group are present on the same part which sequences an unsaturated bond having a π electron orbit and a single bond alternately, the first functional group and the second functional group are fixed in a certain close positional relationship. Hence, storage stability may be deteriorated such as breaking of polymer chain or causing gelation as a side reaction proceeds in a state without adjusting reaction condition, for instance, a long-term storage or by heating. To the contrary, in the case that the conjugated state usually formed between the first site having the first functional group bonded and the second site having the second functional group bonded in the molecule is disconnected or weakened by the three-dimensional structure of the molecule, the first functional group and the second functional group become three-dimensionally apart. Thus, the side reaction of the first functional group and the second functional group is inhibited from proceeding upon storage. As a result, storage stability of the polymer precursor improves. When it is necessary to derive the polymer precursor to the polymer compound, which is an end product, only an intramolecular reaction required originally can be proceeded by adjusting a reaction condition.

As other preferable embodiment of the polymer precursor of the present invention, a polymer precursor, wherein the polymer precursor has a portion which exhibits effect that the polymer precursor itself is cured or solubility of the polymer precursor itself is changed by irradiation with radiation having a wavelength of 440 nm or less in a molecule; or the polymer precursor has a portion which exhibits effect that the polymer precursor itself is cured or solubility of the polymer precursor itself is changed by effect of a compound having absorption in an electromagnetic wave having a wavelength of 440 nm or less in a molecule, is provided.

In the case that the polymer precursor has a reactive portion as mentioned above in the molecule, patterning can be performed by radiations, particularly an electromagnetic wave in a short wavelength range.

Next, a polymer precursor resin composition of the present invention contains the polymer precursor of the present invention.

As a preferable embodiment of the polymer precursor resin composition of the present invention, a polymer precursor resin composition, wherein the polymer precursor has a photosensitive portion which cures the polymer precursor resin composition or changes solubility of the polymer precursor resin composition when irradiated with an electromagnetic wave having a wavelength of 440 nm or less in a molecule; and/or the polymer precursor resin composition further contains a photosensitive component having the photosensitive portion, is provided.

In the case that the polymer precursor resin composition contains the polymer precursor having the photosensitive portion and/or the photosensitive component having the photosensitive portion, patterning can be performed by radiations, particularly an electromagnetic wave in a short wavelength range.

Next, a polymer compound of the present invention is a polymer compound which is obtained by reacting the polymer precursor of the present invention.

Further, a polymer compound resin composition of the present invention is a polymer compound resin composition obtained by reacting the polymer precursor resin composition of the present invention.

The polymer compound obtained from the polymer precursor as an end product and the polymer compound resin composition obtained from the polymer precursor resin composition as an end product can be utilized for all fields and products in which a resin material is conventionally used such as pattern forming materials (resists), coating materials, paints, printing inks, adhesives, fillers, electronic materials, molding materials, resist materials, building materials, 3D modelings, flexible display films, optical members or the like.

Since normally the conjugated state in the molecule is disconnected or weakened even as an end product as same as in the stage of the precursor, the polymer compound and polymer compound resin composition of the present invention have high transparency. Therefore, it is particularly suitable for forming products of fields in which transparency is required, for example, paints, printing inks, color filters, flexible display films, electronic parts, layer insulation films, wire cover films, optical circuits, optical circuit parts, antireflection films, holograms, other optical members or building materials.

Also, a high transparency polyimide precursor of the present invention is one of the preferable polymer precursors of the present invention and has a repeating unit represented by the formula (1a) or (1b) or has both repeating units represented by the following formulae (1a) and (1b):

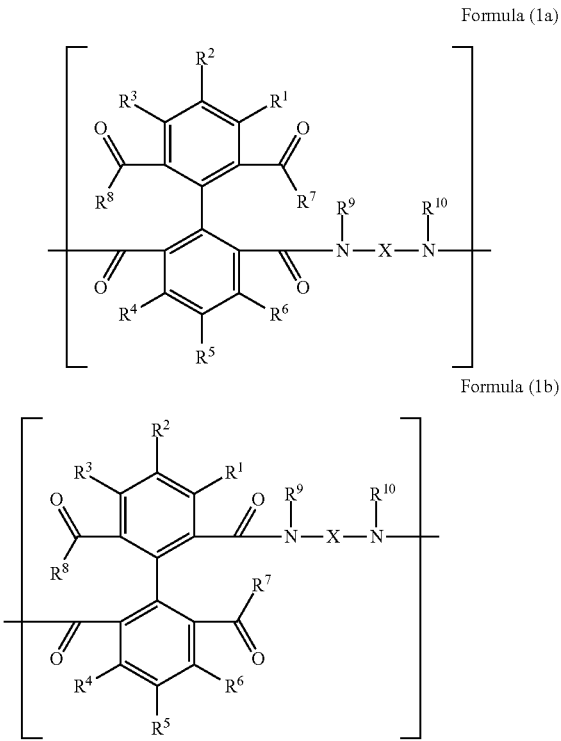

Formula (1a)

Formula (1b)

wherein, each of $R^1$ to $R^6$ is independently a hydrogen atom or a monovalent organic group, which may be bonded each other; each of $R^7$ and $R^8$ is independently a hydrogen atom or a monovalent organic group; "X" is a divalent organic group; each of $R^9$ and $R^{10}$ is independently a hydrogen atom or a monovalent organic group; and groups represented by the same symbol among repeating units in the same molecule may be different atoms or structures.

A skeleton contained in the repeating unit represented by the formula (1a) or (1b) is unstable when arranged in a plane, thus, a relative position of a benzene ring of a biphenyl structure derived from dianhydride contained in the skeleton twists and a conjugation of a π bond is disconnected.

Since the high transparency polyimide precursor of the present invention has such a spatial configuration of a molecular structure, a π conjugation on a polyimide precursor molecular chain is inhibited so as to obtain a polyimide precursor having absorption in shorter wavelength. Also, polyimide finally obtainable from the polyimide precursor has heat resistance as the polyimide is an aromatic polyimide. Also, though depending on a structure, there is a wide range of selection of structure since the polyimide does not have absorption in 400 nm or more in combination with various diamines. As a result, without limit in absorption wavelength, the skeleton can be selected according to the required physical properties such as low thermal expansion or low moisture absorptivity, low permittivity or low dielectric tangent or the like.

Also, a carbonyl group and an amide group finally forming an imide bond are not bonded to the same aromatic ring in a π conjugated structure, the carbonyl group and the amide group are three-dimensionally apart in the state of polyimide precursor, the polyimide precursor of the present invention is superior in storage stability compared to the conventional polyamic acid or the like.

As other preferable embodiment of the high transparency polyimide precursor of the present invention, a high transparency polyimide precursor, wherein the high transparency polyimide precursor has a portion which exhibits effect that the high transparency polyimide precursor itself is cured or solubility of the high transparency polyimide precursor itself is changed by irradiation with an electromagnetic wave having a wavelength of 440 nm or less in a molecule; or the high transparency polyimide precursor has a portion which exhibits effect that the high transparency polyimide precursor itself is cured or solubility of the high transparency polyimide precursor itself is changed by effect of a compound having absorption in an electromagnetic wave having a wavelength of 440 nm or less in a molecule, is provided.

In the case that the high transparency polyimide precursor has a reactive portion as mentioned above in the molecule, patterning can be performed by radiations, particularly an electromagnetic wave in a short wavelength range.

Next, a polyimide precursor resin composition of the present invention contains the high transparency polyimide precursor of the present invention.

As a preferable embodiment of the polyimide precursor resin composition of the present invention, a polyimide precursor resin composition, wherein the high transparency polyimide precursor has a photosensitive portion which cures the polyimide precursor resin composition or changes solubility of the polyimide precursor resin composition when irradiated with an electromagnetic wave having a wavelength of 440 nm or less in a molecule; and/or the polyimide precursor resin composition further contains a photosensitive component having the photosensitive portion, is provided. The high transparency polyimide precursor or the photosensitive component may be contained solely in the polyimide precursor resin composition or two or more kinds may be contained in the same polyimide precursor resin composition.

In the case that the polyimide precursor resin composition contains the high transparency polyimide precursor having the photosensitive portion and/or the photosensitive component having the photosensitive portion, patterning can be performed by radiations, particularly an electromagnetic wave in a short wavelength range, further an electromagnetic wave having a wavelength of 400 nm or less.

Next, polyimide of the present invention is polyimide which is obtained by reacting the high transparency polyimide precursor of the present invention.

Further, a polyimide resin composition of the present invention is a polyimide resin composition obtained by reacting the polyimide precursor resin composition of the present invention.

The polyimide obtained from the high transparency polyimide precursor as an end product and the high transparency polyimide obtained from the polyimide precursor resin composition as an end product can be utilized for all fields and products in which a resin material is conventionally used such as pattern forming materials (resists), coating materials, paints, printing inks, adhesives, fillers, electronic materials, molding materials, resist materials, building materials, 3D modelings, flexible display films, optical members or the like.

The polyimide and polyimide resin composition of the present invention are mainly used as a pattern forming material (resist). A pattern formed thereby functions as a permanent film imparting heat resistance or insulation. Also, since a conjugated state in a molecule is disconnected or weakened even as an end product as same as in the stage of the precursor, the polyimide and polyimide resin composition of the present invention have high transparency.

Therefore, it is particularly suitable for forming products of fields in which transparency is required as well as heat resistance or insulation, for example, paints, printing inks, color filters, flexible display films, electronic parts, layer insulation films, wire cover films, optical circuits, optical circuit parts, antireflection films, holograms, other optical members or building materials.

BRIEF DESCRIPTION OF THE DRAWINGS

In the accompanying drawings.

DESCRIPTION OF THE PREFERRED EMBODIMENT

Figure 1:
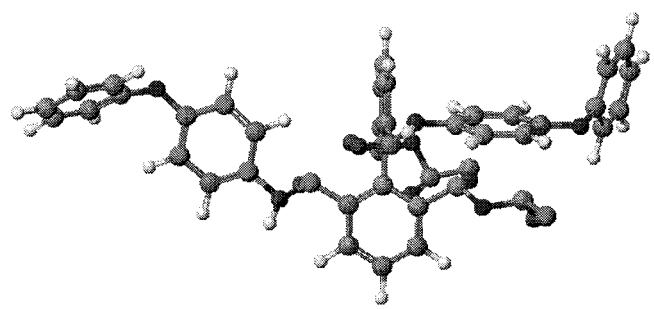
FIG. 1 is a spatial configuration presumed from the result of the MM2 molecular orbital calculation of a model compound having a skeleton represented by the formula (1a)

Hereinafter, the present invention will be explained in detail. Based on a totally novel concept, the inventor has designed a molecule of polyimide and has invented a polyimide precursor which is a precursor of an aromatic polyimide having high heat resistance (particularly preferably a wholly aromatic polyimide) and also has high transparency without introducing fluorine. That is, a concept to disconnect a π electron conjugated structure of a molecular chain of a polyimide precursor by introducing a mechanism to form an imide bond with an amide bond and a carboxylic acid and a derivative thereof respectively bonded to aromatic rings having a different π plane, and controlling a configuration of a skeleton is applied to polyimide.

Further, the present invention has been lead in the study of the inventor that the above-mentioned concept is not limited to the polyimide precursor but can be widely applied to a polymer precursor comprising a part which sequences an unsaturated bond having a π electron orbit and a single bond alternately, and thereby having a conjugated state been easily formed in a molecule.

A polymer precursor of the present invention based on the above concept is a polymer precursor comprising a polymer containing a part which sequences an unsaturated bond having a π electron orbit and a single bond alternately, wherein the polymer precursor has a first functional group and a second functional group which form a repeating unit constituting a polymer skeleton of an end product by an intramolecular reaction, wherein at least a part of a conjugated state formed by the π electron orbit in the molecule is disconnected or weakened due to a three-dimensional structure of the molecule, and wherein a transmittance with respect to an electromagnetic wave of at least one wavelength selected from the group consisting of 436 nm, 405 nm, 365 nm, 248 nm and 193 nm is larger than an expected transmittance provided that the conjugated state is under neither disconnected condition nor weakened condition.

In the polymer precursor of the present invention, at least a part of the conjugated state formed by the π electron orbit in the molecule is disconnected or weakened by the three-dimensional structure of the molecule in the range of 0° C. to 50° C. Hence, the conjugated state can be estimated and evaluated generally by a configuration at 20° C.

Since the polymer precursor of the present invention has a part which sequences an unsaturated bond having a π electron orbit and a single bond alternately, under normal circumstances, the conjugated state is easily formed by the π electron orbit in the molecule and an electron orbit is stabilized, thereby, absorption tends to be exhibited at an electromagnetic wave of a long wavelength.

In general, the π conjugated structure can be found when unsaturated bonds are linked disposing a single bond therebetween. In that case, the single bond has a double bond-like property due to an interaction between unsaturated bonds. An electron (π electron) concerned in the π bond of the unsaturated bonds linked via the single bond is stabilized by having a common π electron orbit. Hence, electrons including an electron which is present on a bond originally of a single bond are in the same plane.

The unsaturated bond in this a case is not limited to a bond between carbon atoms but also includes a hetero atom such as a carbonyl group or the like.

Further, in the broad sense, a π conjugated structure, an unsaturated bond of which is linked with a functional group comprising an atom having a noncovalent electron pair such as an amino group, an ether group or the like, may be exemplified as the π conjugated structure.

The present invention is applicable to all structures having a π conjugated structure heretofore known including the above-mentioned examples.

As a typical example of the π conjugated structure, there may be an aromatic structure. An aromatic structure of the present invention means a chemical structure generally defined as an aromatic series including an aromatic cyclic structure in which unsaturated bonds in the structure are linked in a cyclic form and n-conjugated to form a planar structure such as benzene or naphthalene.

In the present invention, at least a part of the conjugated state which would be normally formed by a π electron orbit present in the molecule of the polymer precursor is disconnected or weakened by the three-dimensional structure of the molecule. Herein, the part in which a conjugated state would be normally formed is a part in which a double bond containing a π bond and a single bond including only an σ bond are sequenced alternately when a planar primary structural formula of the polymer precursor is drawn.

In this manner, stabilization of the π electron orbit present in the molecule of the polymer precursor is inhibited by disconnecting or weakening of at least a part of the conjugated state which would be normally formed. That is, a charge transfer in the molecule caused by the unification of the π electron orbit is inhibited.

As a result, absorption in a long wavelength range vanishes or becomes smaller, hence, the polymer precursor exhibits high transmittance in a shorter wavelength range with respect to an electromagnetic wave.

The three-dimensional structure in the present invention includes both conformation and configuration of a molecule. The conformation means a spatial arrangement of an atom or atomic group bonded to an asymmetric carbon atom around the asymmetric carbon atom, or a spatial arrangement of an atom or atomic group bonded to a structure hard to move in a molecule around the structure, for example, a cis-trans isomer. The configuration means various spatial arrangements of atoms in a molecule which is attained by rotation of two atomic groups linked by one single bond in the molecule used as an axis.

The disconnecting or weakening of the π conjugated structure described in the present invention means that an interaction of π electron orbits becomes not capable or difficult due to the effect of steric hindrance by introducing a substituent while normally unsaturated bonds are linked via a single bond so as to form a conjugated structure.

Specifically, it means the state that two π electron orbits of unsaturated bonds located at both ends of a single bond are not in the same plane. Generally, as an angle of the planes approaches from 0° to 90°, an interaction becomes difficult to be exhibited. When the angle reaches 90°, it is considered to be most difficult to perform the interaction.

Generally, it is considered that when two π electron orbits are on the same plane, the interaction is most capable and they are stable, and when two π electron orbits cross at right angle, the interaction is most tenuous and they are unstable. The stable electron orbit is excited by an electromagnetic wave of low energy, i. e. an electromagnetic wave of long wavelength, thus absorption is large in that part. That is, the larger the degree of inhabitation is against stabilization of the π electron orbit, the further the absorption wavelength shifts to a short wavelength side compared to the original absorption wavelength.

Herein, the effect of steric hindrance means that a tendency or driving force which forms a π plane, that is, a conjugated state, in order to stabilize or unify adjacent two or more π electron orbits due to a three-dimensional structure of a molecule and a tendency or driving force which increases stability of a conformation due to the cause other than the stabilization of the π electron orbit compete against each other at a common position in the molecular structure so that the formation of the π plane is totally inhibited or the π plane is distorted.

As a cause of the steric hindrance, theremaybe, for example, a distortion of a cyclic structure or a spatial hindrance due to a relatively large substituent.

Whether a conjugated state in a molecule of a polymer compound will be disconnected or weakened by a three-dimensional structure of the molecule can be presumed from the result of the molecular orbital calculation of the polymer compound or a similar model compound.

For example, 2,2'-dimethyl-4,4'-diaminobiphenyl corresponding to a model compound of the high transparency polyimide precursor as mentioned hereafter is difficult to be conjugated in comparison with 4,4'-diaminobiphenyl to which a methyl group is not introduced since a free rotation of a single bond between benzene rings is inhibited by two methyl groups introduced at the 2-position and 2'-position.

As aforementioned, a conjugated state of the polymer precursor is disconnected or weakened, and as a result, absorption in a long wavelength range is vanished or becomes smaller so that a transmittance in a shorter wavelength with respect to an electromagnetic wave can be improved.

Desirably, it is preferable that the polymer precursor of the present invention has at least a part of the conjugated state formed by the π electron orbit in the molecule disconnected or weakened due to the three-dimensional structure of the molecule so that a transmittance with respect to an electromagnetic wave of at least one wavelength selected from the group consisting of 436 nm, 405 nm and 365 nm is larger than an expected transmittance provided that the conjugated state is under neither disconnected condition nor weakened condition since sensitivity of an emitting wavelength of a high-pressure mercury lamp utilized for exposure of a photosensitive resin or the like generally increases.

Herein, whether the transmittance with respect to an electromagnetic wave of at least one wavelength selected from the group consisting of 436 nm, 405 nm, 365 nm, 248 nm and 193 nm is larger than the expected transmittance provided that the conjugated state is under neither disconnected condition nor weakened condition can be confirmed by comparing an approximate value of an absorption wavelength range and/or strength which can be presumed from the calculation of a molecular mechanics or molecular orbital such as MM2, AM1 and PM5 of the polymer precursor or a structure of a similar model compound having a conformation without a conjugated state disconnected and an actual measurement value thereof. As the similar model compound, for example, there may be a structure comprising a repeating unit of the polymer precursor in which hydrogen is located on each end of the repeating unit.

As other means, an absorption wavelength of a compound in which a conjugated structure is disconnected or weakened may be compared to confirm with that of a model compound when the model compound of a similar structure, in which a conjugated structure continues, stably exists. For example, when conjugation stabilization is inhibited by steric hindrance of the substituent introduced to the skeleton of the compound, as the similar structure, there may be a structure having the same skeleton but having a substituent substituted to a substituent of smaller steric hindrance (for example, hydrogen or the like).

If there is no compound to compare, a confirmation will suffice if at least a state in which a π conjugated structure is disconnected and/or weakened is the most stable structure according to the calculation of molecular mechanics and molecular orbital, and the polymer precursor has a transmittance of 20% or more with respect to an electromagnetic wave of at least one wavelength selected from the group consisting of 436 nm, 405 nm, 365 nm, 248 nm and 193 nm when a film having a thickness of 1 µm using the polymer precursor is formed or more simply when a film having a thickness of about 1 µm to 5 µm using the polymer precursor is formed. That is, in the case that at least a part of a conjugated state form by a π electron orbit in a molecule is disconnected or weakened by a three-dimensional structure of a molecule, an energy level of the electron orbit increases due to inhibiting stabilization of an electronic state by the conjugated structure. Hence, only an electromagnetic wave having larger energy (an electromagnetic wave having short wavelength) can be absorbed. As a result, absorption at a long wavelength side due to an electron orbit having low energy level vanishes from the absorption of the structure. Therefore, it can be considered that in comparison with the case provided that the conjugated state is not disconnected and weakened, generally, the state in which the Π conjugated structure is disconnected and/or weakened can transmit an electromagnetic wave of shorter wavelength, that is, a light absorption wavelength range shifts to the short wavelength side.

As aforementioned, since the polymer precursor of the present invention has at least a part of the conjugated state formed by the π electron orbit in the molecule disconnected or weakened due to a three-dimensional structure of the molecule, the polymer precursor of the present invention can transmit an electromagnetic wave of shorter wavelength than an electromagnetic wave which is transmitted through a compound having a similar structure in which the conjugated structure continues. In other words, a wavelength showing a certain transmittance (for example, an electromagnetic wave showing 20% of transmittance) of the polymer precursor of the present invention is shorter than that of an electromagnetic wave which is transmitted through a compound having a similar structure in which a conjugated structure continues. The electromagnetic wave has stronger energy when the wavelength is shorter and can be more easily absorbed by a compound. Hence, a wavelength showing a certain transmittance is shorter means that more electromagnetic waves are transmitted. Thereby, the polymer precursor of the present invention is high in transparency.

According to the present invention, excellent sensitivity can be obtained without declining useful properties in which the polymer compound, which is an end product derived from the polymer precursor, originally has in comparison with the case of increasing transmittance of an electromagnetic wave by introducing other chemical structure or a substituent such as fluorine or the like in the molecule.

According to the present invention, in the case that the polymer precursor contains a considerable number of a part which sequences an unsaturated bond having a π electron orbit and a single bond alternately in the molecule, a transmittance can be 20% or more, preferably 30% or more, more preferably 50% or more, particularly preferably 70% or more with respect to an electromagnetic wave of at least one wavelength selected from the group consisting of 436 nm, 405 nm, 365 nm, 248 nm and 193 nm when a film having a thickness of 1 μm using the polymer precursor is formed. It is preferable that a transmittance of the polymer precursor is 20% or more, preferably 30% or more, more preferably 50% or more, particularly preferably 70% or more, with respect to an electromagnetic wave of all wavelength including 436 nm, 405 nm and 365 nm when a film having a thickness of 1 μm using the polymer precursor is formed.

The transmittance decreases as the film becomes thicker. Thus, effect of high transparency of the polymer precursor of the present invention is more apparent when the film is thick. It is further preferable that a transmittance of the polymer precursor of the present invention is 20% or more, preferably 30% or more, more preferably 50% or more, with respect to an electromagnetic wave of at least one wavelength selected from the group consisting of 436 nm, 405 nm, 365 nm, 248 nm and 193 nm, desirably with respect to an electromagnetic wave of all wavelength including 436 nm, 405 nm and 365 nm, when a film having a thickness of 2 μm or more, specifically 3 μm, 5 μm or 10 μm, using the polymer precursor is formed.

If an aromatic structure, which is a typical example of a π conjugated structure, is abundantly contained in a molecule of a polymer precursor, a π conjugated chain of each aromatic structure tends to be unified to form a more stable conjugated state. The present invention is also significantly effective to such a polymer precursor.

Specifically, a polymer precursor, wherein 50 wt % or more of the whole molecular structure is an aromatic structure, is normally a typical example in which a conjugated state is likely to be formed by a π electron orbit in a molecule. However, the polymer compound of the present invention can make a light absorption wavelength range be a shorter wavelength even if 50 wt % or more of the whole molecular structure is an aromatic structure.

Herein, "50 wt % or more of the whole is an aromatic structure" means that a ratio of weight of a constitutional unit forming an aromatic structure in a polymer is 50% or more in the total weight of the polymer. The constitutional unit of an aromatic structure comprises an atom having a π electron concerned in an unsaturated bond forming an aromatic structure and a hydrogen atom or a halogen atom bonded directly to the atom. Specifically, for example, in the case of xylene having a chemical structure of $CH_3—C_6H_4—CH_3$, $C_6H_4$ is an aromatic structure. In a chemical structure of $CH_3—C_6Cl_4—CH_3$, $C_6Cl_4$ is an aromatic structure.

A means to confirm whether 50 wt % or more of the whole is an aromatic structure is not particularly limited. For example, a means such as a $^1H$- and $^{13}C$-NMR spectrum (nuclear magnetic resonance spectrum) of a solid or liquid, an infrared spectrum, a gas chromatography or the like can be used.

Since in the case of containing a part which sequences an unsaturated bond having a π electron orbit and a single bond alternately as a part of a polymer skeleton, a conjugated state is likely to be formed in a long molecular chain in the molecule, the benefit which can be obtained by apply the present invention to make absorption wavelength be a shorter wavelength thus increases.

From the above viewpoint, as a preferable embodiment of the present invention, there may be a polymer compound, wherein the part which sequences an unsaturated bond having a π electron orbit and a single bond alternately contains a chain structure of two or more repeating units which constitutes a polymer skeleton of the polymer precursor, and wherein a conjugated state is disconnected or weakened in the chain structure.

Also, in the case of containing plural aromatic rings as a part of a polymer skeleton, the conjugated state is highly likely to be formed in the molecule, hence, the benefit obtainable by improving transparency by applying the present invention thus increases.

From the above viewpoint, as another embodiment of the present invention, there may be a polymer precursor, wherein 50% by mole or more of repeating units constituting a polymer skeleton of the polymer precursor is a repeating unit containing an aromatic ring or a condensed ring containing an aromatic ring to be a part of the polymer skeleton of the polymer precursor, and wherein at least a part of a conjugated state between the aromatic rings or the condensed rings to be a part of the polymer skeleton is disconnected or weakened due to a three-dimensional structure of the molecule.

In this case, a mole ratio of the three-dimensional structure of the molecule which disconnects or weakens the conjugated state is preferably 50% or more with respect to an amount of the repeating unit containing the aromatic ring or the condensed ring containing an aromatic ring to be a part of the polymer precursor.

The polymer precursor of the present invention is a polymer and has a first functional group and a second functional group which have reactivity and positional relationship to form a repeating unit constituting a polymer skeleton of an end product by an intramolecular reaction.

As such a first functional group and second functional group, there may be functional groups forming a ring structure to be a part of the polymer skeleton by being bonded from each other due to an intramolecular ring closure reaction.

For example, if the first functional group is an amide group and the second functional group is a carboxyl group, a polyimide skeleton is formed. If the first functional group is an amide group and the second functional group is a hydroxyl group, a polyoxazole skeleton is formed. If the first functional group is an amide group and the second functional group is an amino group, a polyimidazole skeleton is formed.

A reaction in which an oxazole skeleton as a basic skeleton of the polyoxazole skeleton is formed is represented by the following formula (5). Also, a reaction in which an imidazole skeleton as a basic skeleton of the polyimidazole skeleton is formed is represented by the following formula (6).

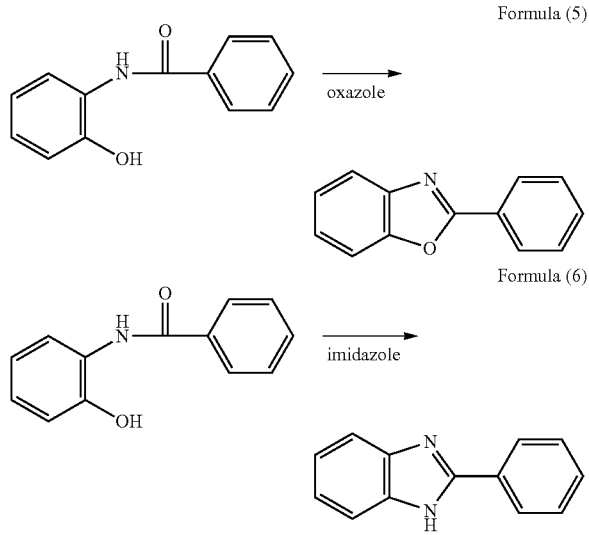

Formula (5)

Formula (6)

The precursor compounds forming three kinds of skeletons have elimination of water molecule or an alcohol molecule in accordance with an intramolecular ring closure reaction.

Mainly for a purpose requiring heat resistance, three compounds containing many aromatic skeletons are used. On the other hand, as many aromatic structures are contained, a conjugated structure is caused, thereby, there is absorption in a long wavelength range, a transmittance is low with respect to an exposure light source, and sensitivity is low.

From the viewpoint of storage stability of the polymer precursor, a polymer precursor, wherein the part which sequences an unsaturated bond having a π electron orbit and a single bond alternately has a first site and a second site which are different from each other, wherein the first functional group and the first site, and the second functional group and the second site are respectively bonded directly or via other atom, and wherein the conjugated state formed between the first site and the second site is disconnected or weakened due to the three-dimensional structure of the molecule, is preferable.

In the case that the first functional group and the second functional group are present on the same part which sequences an unsaturated bond having a π electron orbit and a single bond alternately, the first functional group and the second functional group may be in the same plane and fixed in a certain close positional relationship. Hence, storage stability may be deteriorated such as breaking of polymer chain or causing gelation as a side reaction proceeds in a state without adjusting reaction condition, for instance, a long-term storage or by heating. To the contrary, in the case that the conjugated state usually formed between the first site having the first functional group bonded and the second site having the second functional group bonded in the molecule is disconnected or weakened by the three-dimensional structure of the molecule, the first functional group and the second functional group become three-dimensionally apart. Thus, the side reaction is inhibited from proceeding upon storage. As a result, storage stability of the polymer precursor improves. When it is necessary to derive the polymer precursor to the polymer compound, which is an end product, only an intramolecular reaction required originally can be proceeded by adjusting a reaction condition.

As an example, there may be a polymer precursor, wherein the part which sequences an unsaturated bond having a π electron orbit and a single bond alternately contains at least two aromatic rings, wherein the first site is present at a first aromatic ring of the aromatic rings and the second site is present at a second aromatic ring of the aromatic rings, and wherein the conjugated state formed between the first aromatic ring and the second aromatic ring is disconnected or weakened due to the three-dimensional structure of the molecule.

As a more specific example, the polymer precursor is a polyimide precursor comprising a repeating unit derived from acid anhydride having an anhydride group formed with carboxyl groups bonded to aromatic rings having different π plane directly or via other atom. In such a case, storage stability improves since a reverse reaction from the precursor to the acid anhydride is inhibited.

The polymer precursor of the present invention has excellent storage stability by controlling a three-dimensional structure so that the reverse reaction is hard to proceed. Specifically, preferable storage stability is a rate of change of 20% or less, preferably 10% or less, more preferably 5% or less, in terms of the polystyrene calibrated-weight average molecular weight by gel permeation chromatography (GPC) of a 0.5 wt % solution of the polymer precursor in a good solvent which can dissolve the polymer precursor by 0.5 wt % or more and substantially contains water after stored at 23° C. for 25 hours. Further, it is also preferable that rates of change is 20% or less, preferably 10% or less, more preferably 5% or less, in terms of the polystyrene calibrated-weight average molecular weight by gel permeation chromatography after storing the above 0.5 wt % solution at 23° C. for 50 hours, 150 hours and 300 hours. Herein, the rate of change of weight average molecular weight means a difference between weight average molecular weights before and after storing with respect to a weight average molecular weight before storing (a difference between weight average molecular weights before and after storing/a weight average molecular weight before storing). "Substantially containing water" means a state without dehydration when the above-mentioned good solvent has property that it is likely to contain water in the air, and means a state having a percentage of water content in the solvent of about 0.001 wt % to 10 wt %, further about 0.005 wt % to 1 wt %.

If the part which sequences an unsaturated bond having a π electron orbit and a single bond alternately contains the chain structure of two or more repeating units constituting the polymer skeleton of the polymer precursor, the first aromatic ring having the first functional group and the second aromatic ring having the second functional group may be contained in different repeating units, and the conjugated state may be disconnected or weakened due to the three-dimensional structure of the molecule in the polymer skeleton connecting the first aromatic ring and the second aromatic ring.

Also, if the part which sequences an unsaturated bond having a π electron orbit and a single bond alternately is contained in the same repeating unit constituting the polymer skeleton of the polymer precursor, the first aromatic ring having the first functional group and the second aromatic ring having the second functional group may be contained in the same repeating unit, and the conjugated state may be disconnected or weakened due to the three-dimensional structure of the molecule at any position in the repeating unit.

In this case, it is preferable that 50% by mole or more of the repeating unit constituting the polymer skeleton of the polymer precursor is a repeating unit containing both first aromatic ring having the first functional group and second aromatic ring having the second functional group.

The aforementioned polymer precursor of the present invention can be used as a resin material for forming various coating layers having a pattern or a form, products or members as it is or by mixing with other components to prepare a precursor resin composition. Particularly, the polymer precursor of the present invention is suitably used as a photosensitive resin since absorption of an electromagnetic wave is shifted to a shorter wavelength range so as to improve a transmittance of an electromagnetic wave of a long wavelength range.

As a method to use the polymer precursor of the present invention as a photosensitive resin, there may be a method to introduce a photosensitive portion which cures the polymer precursor itself or changes solubility of the polymer precursor itself when irradiated with radiations having a wavelength of 440 nm or less in the molecule of the polymer precursor.

As other method, there may be a method to introduce a reactive portion (that is, an indirect photosensitive portion) which exhibits effect that the polymer precursor itself is cured or solubility of the polymer precursor itself is changed due to activation by effect of a compound having absorption in an electromagnetic wave having a wavelength of 440 nm or less in the molecule of the polymer precursor.

Also, as other method, a photosensitive polymer precursor resin composition prepared by mixing the above-mentioned polymer precursor not having the photosensitive portion introduced with the above-mentioned photosensitive component having the photosensitive portion may be used.

Further, a photosensitive polymer precursor resin composition prepared by mixing the polymer precursor having the photosensitive portion introduced with the photosensitive component may be used.

A coating layer containing a polymer compound or a resin composition containing the polymer compound in a predetermined pattern form can be obtained in such a manner that after a coating layer of such a photosensitive polymer precursor resin composition is exposed with radiations, particularly an electromagnetic wave, of a predetermined wavelength followed by a predetermined operation if required and development, the first functional group and the second functional group of the polymer precursor are subject to an intramolecular reaction by heating or the effect of catalyst so as to be converted to a polymer compound, which is an end product.

Hereafter, a high transparency polyimide precursor is explained in detail as an example of the polymer precursor of the present invention. Hereafter, properties, advantage and other contents of the high transparency polyimide precursor to be explained are, if not particularly conflictive, common explanation of the polymer precursor of the present invention in general.

The high transparency polyimide precursor of the present invention has a repeating unit represented by the formula (1a) or (1b) or has both repeating units represented by the following formulae (1a) and (1b), and is a precursor of polyimide containing a seven-membered ring imide structure as an end product:

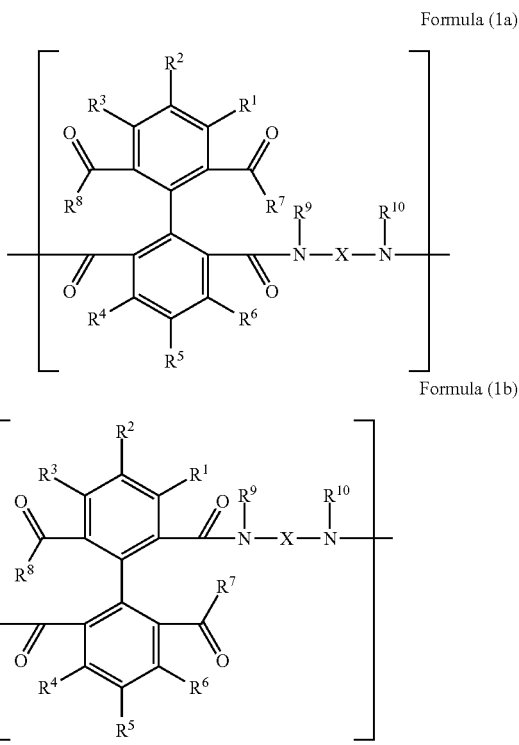

Formula (1a)

Formula (1b)

wherein, each of $R^1$ to $R^6$ is independently a hydrogen atom or a monovalent organic group, which may be bonded each other; each of $R^7$ and $R^8$ is independently a hydrogen atom or a monovalent organic group; "X" is a divalent organic group; each of $R^9$ and $R^{10}$ is independently a hydrogen atom or a monovalent organic group; and groups represented by the same symbol among repeating units in the same molecule may be different atoms or structures.

A polyimide precursor derived from an aromatic five-membered ring dianhydride represented by the polyimide precursor derived from pyromellitic dianhydride and a polyimide precursor having an aromatic six-membered ring dianhydride structure represented by a polyimide precursor derived from 1,4,5,8,-naphthalene tetracarboxylic dianhydride have carbonyl groups finally forming an imide bond in the same π plane, thus, a conjugated structure of a π electron tends to spread over a molecular chain of the polyimide precursor.

Since a polyimide precursor derived from 3,3',4,4'-biphenyltetracarboxylic dianhydride also has an amide group and a carboxyl group capable of an intramolecular ring closure reaction bonded to the same benzene ring, positions of two kinds of substituents are fixed, thus, a reverse reaction is likely to proceed.

Also, since a single bond connecting two benzene rings derived from acid anhydride can freely rotate, and a π conjugation structure can be formed by the benzene rings, a transmittance of an electromagnetic wave in a low wavelength range is often low.

Since a polyimide precursor derived from 2,2',3,3'-biphenyltetracarboxylic dianhydride also has an amide group and a carboxyl group capable of an intramolecular ring closure reaction bonded to the same benzene ring, a reverse reaction is likely to proceed.

Also, as for the polyimide precursor derived from 2,2',3,3'-biphenyltetracarboxylic dianhydride, two aromatic rings derived from acid anhydride is less likely to conjugate three-dimensionally. However, polyimide derived from the precursor is highly colored due to a five-membered ring imide structure, and further coefficient of expansion is less likely to decrease since a molecular chain has a flexuous structure. Hence, an applicable usage of the polyimide is limited.

Particularly, in the case of wholly aromatic polyimide using not only aromatic acid dianhydride as an acid component but also aromatic diamine as a diamine component, the conjugated structure is more likely to spread over the molecular chain of polyimide in wide range, thus, it is more likely to cause a coloring phenomenon.

On the contrary, the repeating unit represented by the formula (1a) or (1b) has a structure derived from 2,2',6,6'-biphenyltetracarboxylic dianhydride or a compound having a substituent on its aromatic ring, and is three-dimensionally unstable when two aromatic rings derived from tetracarboxylic acid are arranged in a plane. Hence, a relative position of benzene rings of the biphenyl structure contained in the polyimide precursor is twisted so that a conjugation of a π bond is disconnected.

FIG. 1 shows a spatial arrangement presumed from the result of the MM2 molecular orbital calculation of a model compound having a skeleton of the formula (1a) represented by the following formula:

It is found by the present invention that a polyimide precursor which is produced using 2,2',6,6'-biphenyltetracarboxylic dianhydride based on a novel molecular design to enhance transparency of the polyimide precursor has a good transparency due to a mechanism in which a conventional high transparency polyimide precursor does not have. The present invention shows suitable applications of the polyimide precursor in the field which can utilize its high transparency as well as original properties of the polyimide precursor.

In the repeating unit represented by the formula (1a) or (1b), a substituent other than a hydrogen atom may be introduced at the position of $R^1$ to $R^6$. If the repeating unit represented by the formula (1a) or (1b) of the polyimide precursor of the present invention has a skeleton derived from 2,2',6,6'-biphenyltetracarboxylic dianhydride, transparency improves. Thus, even the substituents are introduced to $R^1$ to $R^6$, a similar effect can be expected.

As a monovalent organic group which can be introduced to $R^1$ to $R^6$ other than a hydrogen atom, there may be, for example, a halogen atom, a hydroxyl group, a mercapto group, a primary amino group, a secondary amino group, a tertiary amino group, a cyano group, a silyl group, a silanol group, an alkoxy group, a nitro group, a carboxyl group, an acetyl group, an acetoxy group, a sulfo group, a saturated or unsaturated alkyl group, a saturated or unsaturated halogenated alkyl group, an aromatic group such as phenyl, naphthyl or the like, an allyl group or the like. $R^1$ to $R^6$ may be the same

[model compound]

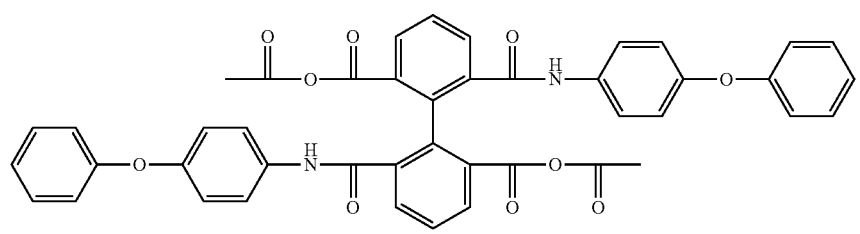

Since a bond which bonds benzene rings of the biphenyl skeleton of 2,2',6,6'-biphenyltetracarboxylic dianhydride can rotate, a reaction is performed with amine to be a polyimide precursor. Thus, it is assumed from the result of the MM2 molecular orbital calculation that two benzene rings are not present in the same plane due to steric hindrance, but have a configuration that run at right angles to each other.

Since the high transparency polyimide precursor of the present invention has such a spatial arrangement of the molecular structure, the polyimide precursor has the π conjugation on the molecular chain of the polyimide precursor inhibited so that the absorption wavelength becomes a shorter wavelength while maintaining heat resistance of aromatic polyimide in a final imidized product.

Also, since the reverse reaction is less likely to proceed in the high transparency polyimide precursor of the present invention, excellent storage stability is also exhibited. Further, since 2,2',6,6'-biphenyltetracarboxylic dianhydride, which is a starting material, can be obtained by a relatively simple synthesis method such as an oxidation reaction of pyrene or the like, it is available at a low price.

The polyimide precursor which is produced using 2,2',6,6'-biphenyltetracarboxylic dianhydride has been conventionally known, however, the physical properties thereof have not been known in detail. Particularly, properties of good transparency and storage stability have not ever known at all.

or different from each other. Two or more groups among $R^1$ to $R^6$, particularly, two or three groups among $R^1$ to $R^3$ and/or two or three groups among $R^4$ to $R^6$ may be bonded each other to form a ring structure.

The substituents $R^1$ to $R^6$ may be introduced in a state of a starting material so that a state of acid dianhydride has the substituents already introduced, or may be reacted with diamine so as to introduce it in a state of polyimide or polyamic acid. Also, a wavelength of light to be absorbed can be adjusted by introducing a substituent, hence, a desired wavelength can be absorbed by introducing a substituent.

As a guide to determine kinds of substituent to be introduced in order to shift an absorption wavelength with respect to a desired wavelength, A. I. Scott, *Interpretation of the Ultraviolet Spectra of Natural Products*, 1964, or a table in R. M. Silverstein, *Identification of Organic Compound by Spectrum*, 5th edition, 1993, may be of reference.

"X" in each of the formula (1a) and the formula (1b) is a divalent organic group. There may be, for example, a divalent organic group which corresponds to each diamine component to be hereinafter described, that is, a structure comprising a diamine component without amino groups of both ends which are concerned in formation of a polyimide chain. Between each repeating unit which is present in the same polyimide chain, groups represented by the same symbol may be different atoms or structures.

$R^7$ and $R^8$ in the formula (1a) or (1b) are a hydrogen atom and/or a monovalent organic group. Specifically, as the monovalent organic group, for example, there may be a hydroxyl group, a halogen atom, a mercapto group, a primary amino group, a secondary amino group, a tertiary amino group, a cyano group, a silyl group, a silanol group, an alkoxy group, a nitro group, a carboxyl group, an acetyl group, an acetoxy group, a sulfo group, a saturated or unsaturated alkyl group, a saturated or unsaturated halogenated alkyl group, an aromatic group such as phenyl, naphthyl or the like, an allyl group, an ethylenically unsaturated bond containing group or the like. $R^7$ and $R^8$ may be the same or different from each other. Various kinds of $R^7$ and $R^8$ may be mixed in each repeating unit.

The ethylenically unsaturated bond containing group means a substituent having one or more ethylenically unsaturated bonds. Specifically, for example, there may be an allyloxy group, a 2-acryloyloxyethyloxy group, a 2-methacryloyloxypropyloxy group, a 2-acryloyloxyethylamino group, a 2-methacryloyloxyethylamino group, a 2-acryloyloxypropylamino group, a 2-hydroxy-3-methacryloyloxyproloxy group, a 2-hydroxy-3-acryloyloxypropyloxy group, a 2-hydroxy-4-pentenyloxy group, a 2-acryloyloxyethyl dimethylammonium group, a 2-methacryloyloxypropyl trimethylammonium group, or a derivative thereof.

$R^9$ and $R^{10}$ are independently a hydrogen atom and/or a monovalent organic group. Specifically, for example, there may be a hydroxyl group, a halogen atom, a mercapto group, a primary amino group, a secondary amino group, a tertiary amino group, a cyano group, a silyl group, a silanol group, an alkoxy group, a nitro group, a carboxyl group, an acetyl group, an acetoxy group, a sulfo group, a saturated or unsaturated alkyl group, a saturated or unsaturated halogenated alkyl group, an aromatic group such as phenyl, naphthyl or the like, an allyl group, an ethylenically unsaturated bond containing group or the like. $R^9$ and $R^{10}$ may be the same or different from each other. Various kinds of $R^9$ and $R^{10}$ may be mixed in each repeating unit.

As for the high transparency polyimide precursor of the present invention, from the viewpoint of enhancing heat resistance and dimensional stability of polyimide to be finally obtained, it is preferable to use a wholly aromatic polyimide precursor in which a portion derived from acid dianhydride has an aromatic structure and further a portion derived from diamine has also an aromatic structure. Therefore, it is preferable that "X", which is a structure derived from a diamine component, is a structure derived from aromatic diamine. Herein, the wholly aromatic polyimide precursor means a polyimide precursor obtainable from copolymerization of an aromatic acid component and an aromatic amine component or polymerization of aromatic acid/amine component. Also, the aromatic acid component means a compound having all four acidic groups forming a polyimide skeleton are substituted on aromatic rings. The aromatic amine component means a compound having both of two amino groups forming a polyimide skeleton are substituted on aromatic rings. The aromatic acid/amine component means a compound having both acidic group and amino group forming a polyimide skeleton substituted on aromatic rings. As it is clear from examples of a starting material to be hereinafter described, not all acidic groups or amino groups are necessary to be present on the same aromatic ring.

The solubility of the high transparency polyimide precursor of the present invention may also be improved by introducing a substituent in the molecular structure. From this point of view, it is preferable that $R^1$ to $R^6$ of the above-mentioned substituent is selected from the group consisting of a saturated and unsaturated alkyl group having 1 to 15 carbons, a saturated and unsaturated alkoxy group having 1 to 15 carbons, a bromo group, a chloro group, a fluoro group, a nitro group, a primary to tertiary amino groups and the like. Also, these groups may be present at the divalent organic group "X".

The high transparency polyimide precursor of the present invention may contain a repeating unit other than the formula (1a) or (1b) as far as the object of the present invention, which is to improve properties such as transparency, heat resistance, dimensional stability or the like of polyimide to be finally obtained, can be attained.

For example, the polyimide precursor of the present invention may contain a repeating unit having a structure other than the formula (1a) or (1b), or a repeating unit which is not an imide structure such as a repeating unit of an amide structure (a repeating unit of polyamide).

As the repeating unit having a structure other than the formula (1a) or (1b), there may be, for example, a repeating unit represented by the following formula (2):

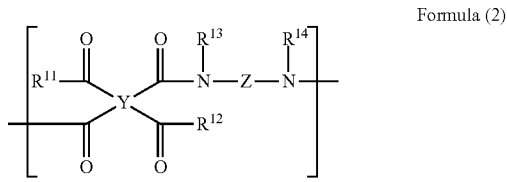

Formula (2)

wherein, each of $R^{11}$ and $R^{12}$ is independently a hydrogen atom or a monovalent organic group; each of $R^{13}$ and $R^{14}$ is independently a hydrogen atom or a monovalent organic group; "Y" is a tetravalent organic group; "Z" is a divalent organic group; and groups represented by the same symbol among repeating units in the same molecule may be different atoms or structures.

Polyimide containing a repeating unit represented by the formula (1a) and/or (1b) and a repeating unit represented by the formula (2) may be represented by the following formula (3). The polyimide represented by the formula (3) may contain a repeating unit other than the formula (1a) and/or (1b) and the formula (2):

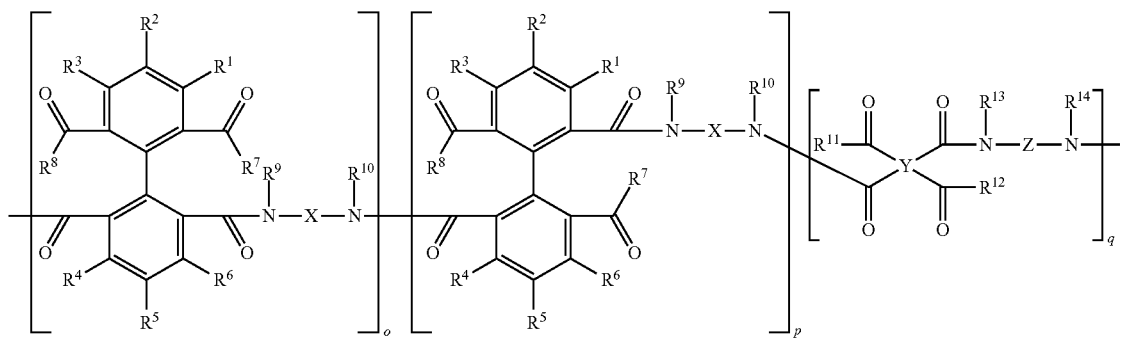

Formula (3)

wherein, in the formula (3), each symbol is the same as in the formula (1a) and/or (1b) or the formula (2); among repeating units present in the same molecule, groups represented by the same symbol may be different atoms or structures; at least one of "o" and "p" is a natural number of 1 or more and "o", "p" and "q" are natural numbers of 0 or more; and each unit of the formula (1a), the formula (1b) and the formula (2) may be a random arrangement or an arrangement with regularity.

The imide structure other than the formula (1a) or (1b) may be introduced into a polyimide precursor chain by using acid dianhydride other than 2,2',6,6'-biphenyltetracarboxylic dianhydride or a derivative thereof.

As a production method of producing the polyimide precursor of the present invention, conventional methods can be applied, for example, but may not be limited thereto:

(1) a method wherein acid dianhydride and diamine are synthesized to obtain polyamic acid, which is a precursor; and (2) a method wherein a polyimide precursor is synthesized by reacting carboxylic acid of ester acid or amide acid monomer synthesized by reacting dianhydride with a monovalent alcohol an amino compound, an epoxy compound or the like with a diamino compound or a derivative thereof.

As aforementioned, as acid dianhydride used herein, not only 2,2',6,6'-biphenyltetracarboxylic dianhydride but also a derivative preliminary having a substituent introduced at one or more of $R^1$ to $R^6$ according to the purpose. As the acid dianhydride, acid dianhydride other than 2,2',6,6'-biphenyltetracarboxylic dianhydride and/or the derivative thereof may be used together. Two or more of 2,2',6,6'-biphenyltetracarboxylic dianhydride and/or the derivative thereof and other acid dianhydrides may be used together as far as polyimide precursor has transparency.

As the acid dianhydride which can be used together with 2,2',6,6'-biphenyltetracarboxylic dianhydride and/or the derivative thereof, aromatic acid dianhydride is preferable from the viewpoint of a heat resistance. According to desired physical properties, acid dianhydride other than 2,2',6,6'-biphenyltetracarboxylic dianhydride may be used within 50% by mole, preferably 30% by mole, of the whole amount of acid dianhydride.

As other acid dianhydride which can be used together with 2,2',6,6'-biphenyltetracarboxylic dianhydride and/or the derivatives at the same time, there may be, for example, ethylenetetracarboxylic dianhydride, butanetetracarboxylic dianhydride, cyclobutanetetracarboxylic dianhydride, cyclopentanetetracarboxylic dianhydride, pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(3,4-dicarboxyphenyl)sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 1,3-bis[(3,4-dicarboxy)benzoyl]benzene dianhydride, 1,4-bis[(3,4-dicarboxy)benzoyl]benzene dianhydride, 2,2-bis{4-[4-(1,2-dicarboxy)phenoxy]phenyl}propane dianhydride, 2,2-bis{4-[3-(1,2-dicarboxy)phenoxy]phenyl}propane dianhydride, bis{4-[4-(1,2-dicarboxy)phenoxy]phenyl}ketone dianhydride, bis{4-[3-(1,2-dicarboxy)phenoxy]phenyl}ketone dianhydride, 4,4'-bis[4-(1,2-dicarboxy)phenoxy]biphenyl dianhydride, 4,4'-bis[3-(1,2-dicarboxy)phenoxy]biphenyl dianhydride, bis{4-[4-(1,2-dicarboxy)phenoxy]phenyl}ketone dianhydride, bis{4-[3-(1,2-dicarboxy)phenoxy]phenyl}ketone dianhydride, bis{4-[4-(1,2-dicarboxy)phenoxy]phenyl}sulfone dianhydride, bis{4-[3-(1,2-dicarboxy)phenoxy]phenyl}sulfone dianhydride, bis{4-[4-(1,2-dicarboxy)phenoxy]phenyl}sulfido dianhydride, bis{4-[3-(1,2-dicarboxy)phenoxy]phenyl}sulfido dianhydride, 2,2-bis{4-[4-(1,2-dicarboxy)phenoxy]phenyl}-1,1,1,3,3,3-hexafuloropropane dianhydride, 2,2-bis{4-[3-(1,2-dicarboxy)phenoxy]phenyl}-1,1,1,3,3,3-propane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride or the like. They may be used solely or in a mixture of two or more kinds. As tetracarboxylic dianhydride which may be used particularly preferably, there may be pyromellitic dianhydride, 3,3',4,4'-benzophenonetetracarboxylic dianhydride, 3,3',4,4'-biphenyltetracarboxylic dianhydride, bis(3,4-dicarboxyphenyl)ether dianhydride, or 2,2-bis(3,4-dicarboxyphenyl)-1,1,1,3,3,3-hexafluoropropane dianhydride.

If acid dianhydride having fluorine introduced or acid dianhydride having an alicyclic skeleton is used as acid dianhydride for using together, physical properties such as solubility, thermal expansion coefficient of finally obtainable polyimide or the like can be adjusted without appreciable decline in transparency. Also, if a rigid acid dianhydride such as pyromellitic anhydride, 3,3',4,4'-biphenyltetracarboxylic dianhydride, 1,4,5,8-naphthalene tetracarboxylic dianhydride or the like is used, the coefficient of linear thermal expansion of finally obtainable polyimide decreases. However, the rigid acid dianhydride tends to inhibit improvement of transparency, thus may be used together caring about copolymerization ratio according to the purpose.

On the other hand, one kind of diamine may be solely used or two or more kinds of diamine may be used together for an amine component. As usable diamines, there may be, but may not be limited thereto, p-phenylenediamine, m-phenylenediamine, o-phenylenediamine, 3,3'-diaminodiphenyl ether, 3,4'-diaminodiphenyl ether, 4,4'-diaminodiphenyl ether, 3,3'-diaminodiphenyl sulfido, 3,4'-diaminodiphenyl sulfido, 4,4'-diaminodiphenyl sulfido, 3,3'-diaminodiphenyl sulfone, 3,4'-diaminodiphenyl sulfone, 4,4'-diaminodiphenyl sulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4'-diaminodiphenylmethane, 2,2-di(3-aminophenyl)propane, 2,2-di(4-aminophenyl)propane, 2-(3-aminophenyl)-2-(4-aminophenyl)propane, 2,2-di(3-aminophenyl)-1,1,1,3,3,3-hexafluoropropane, 2,2-di(4-aminophenyl)-1,1,1,3,3,3-hexafluoropropane, 2-(3-aminophenyl)-2-(4-aminophenyl)-1,1,1,3,3,3-hexafluoro propane, 1,1-di(3-aminophenyl)-1-phenylethane, 1,1-di(4-aminophenyl)-1-phenylethane, 1-(3-aminophenyl)-1-(4-aminophenyl)-1-phenylethane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 1,3-bis(3-amino-α,α-ditrifluoromethylbenzyl)benzene, 1,3-bis(4-amino-α,α-ditrifluoromethylbenzyl)benzene, 1,4-bis(3-amino-α,α-ditrifluoromethylbenzyl)benzene, 1,4-bis(4-amino-α,α-ditrifluoromethylbenzyl)benzene, 2,6-bis(3-aminophenoxy)benzonitrile, 2,6-bis(3-aminophenoxy)pyridine, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfido, bis[4-(4-aminophenoxy)phenyl]sulfido, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis[4-(3-aminophenoxy)benzoyl]benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-aminophenoxy)-α,α-dimethylbenzyl]benzene, 1,3-bis[4-(4-aminophenoxy)-α,α-dimethylbenzyl]benzene, 1,4-bis[4-(3-aminophenoxy)-α,α-dimethylbenzyl]benzene, 1,4-bis[4-(4-aminophenoxy)-α,α-dimethylbenzyl]benzene, 4,4'-bis[4-(4-aminophenoxy)benzoyl]diphenylether, 4,4'-bis[4-(4-amino-α,α-dimethylbenzyl)phenoxy]benzophenone, 4,4'-bis[4-(4-amino-α,α-dimethylbenzyl)phenoxy]diphenyl sulfone, 4,4'-bis[4-(4-aminophenoxy)phenoxy]diphenylsulfone, 3,3'-diamino-4,4'-diphenoxybenzophenone, 3,3'-diamino-4,4'-dibiphenoxybenzophenone, 3,3'-diamino-4-phenoxybenzophenone, 3,3'-diamino-4-biphenoxybenzophenone, 6,6'-bis(3-aminophenoxy)-3,3,3',3'-tetramethyl-1,1'-spirobiindane, 6,6'-bis(4-aminophenoxy)-3,3,3',3'-tetramethyl-1,1'-spirobiindane, 1,3-bis(3-aminopropyl)tetramethyldisiloxane, 1,3-bis(4-aminobutyl)tetramethyldisiloxane, α,ω-bis(3-aminopropyl)polydimethylsiloxane, α,ω-bis(3-aminobutyl)polydimethylsiloxane, bis(aminomethyl)ether, bis(2-aminoethyl)ether, bis(3-aminopropyl)ether, bis(2-aminomethoxy)ethyl]ether, bis[2-(2-aminoethoxy)ethyl]ether, bis[2-(3-aminoprotoxy)ethyl]ether, 1,2-bis(aminomethoxy)ethane, 1,2-bis(2-aminoethoxy)ethane, 1,2-bis[2-(aminomethoxy)ethoxy]ethane, 1,2-bis[2-(2-aminoethoxy)ethoxy]ethane, ethylene glycol bis(3-aminopropyl)ether, diethylene glycol bis(3-aminopropyl)ether, triethylene glycol bis(3-aminopropyl)ether, ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,2-diaminocyclohexane, 1,3-diaminocyclohexane, 1,4-diaminocyclohexane, 1,2-di(2-aminoethyl)cyclohexane, 1,3-di(2-aminoethyl)cyclohexane, 1,4-di(2-aminoethyl)cyclohexane, bis(4-aminocyclohexyl)methane, 2,6-bis(aminomethyl)bicyclo[2,2,1]heptane, or 2,5-bis(aminomethyl)bicyclo[2,2,1]heptane. Also, diamine in which a part or all of the hydrogen atoms on the aromatic ring of the above-mentioned diamine is substituted by a substituent selected from the group consisting of a fluoro group, a methyl group, a methoxy group, a trifluoromethyl group, or a trifluoromethoxy group can also be used. Moreover, according to the purpose, diamine in which a part or all of the hydrogen atoms on the aromatic ring has one or more groups among an ethynyl group, a benzocyclobutene-4'-yl group, a vinyl group, an allyl group, a cyano group, an isocyanate group and an isopropenyl group to be crosslinked points introduced as a substituent can also be used.

Diamine can be selected according to the desired physical property. When rigid diamine such as p-phenylenediamine or the like is used, the coefficient of expansion of polyimide derived from the high transparency polyimide precursor becomes low.

As rigid diamine in which two amino groups bonds together to the same aromatic ring, there may be p-phenylenediamine, m-phenylenediamine, 1,4-diaminonaphthalene, 1,5-diaminonaphthalene, 2,6-diaminonaphthalene, 2,7-diaminonaphthalene, 1,4-diaminoanthracene or the like.

Further, there may be diamine in which two or more aromatic rings are bonded by single bonds and two or more amino groups are respectively bonded on a different aromatic ring directly or as a part of a substituent. For example, the following formula (4) may be exemplified. Specifically, there may be benzidine or the like:

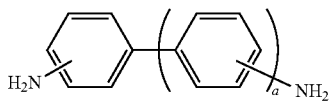

Formula (4)

wherein, "a" is a natural number of 1 or more; and the amino groups are bonded in a para or meta position with respect to the bond between the benzene rings.

Further, in the formula (4), diamine having substituents which are not concerned in bonding with other benzenes at positions of the benzene rings where no amino group is substituted may be used. The substituents are monovalent organic groups, which may be bonded each other.

Specifically, for example, there may be 2,2'-dimethyl-4,4'-diaminobiphenyl, 2,2'-ditrifluoromethyl-4,4'-diaminobiphenyl, 3,3'-dichloro-4,4'-diaminobiphenyl, 3,3'-dimethoxy-4,4'-diaminobiphenyl, 3,3'-dimethyl-4,4'-diaminobiphenyl or the like.

Also, in the case of using the polyimide precursor and polyimide derived therefrom of the present invention as an optical waveguide or an optical circuit part, a transmittance with respect to an electromagnetic wave having a wavelength of 1 μm or more can be improved if fluorine is introduced as a substituent of the aromatic ring.

On the other hand, if diamine having a siloxane skeleton such as 1,3-bis(3-aminopropyl)tetramethyl disiloxane or the like is used as diamine, an elastic modulus decreases and the glass transition temperature can be lowered of the polyimide precursor and polyimide derived therefrom of the present invention.

Herein, aromatic diamine is preferably selected as the diamine from the viewpoint of heat resistance. Diamine other than aromatic series such as aliphatic diamine, siloxane based diamine or the like may be also used according to the desired physical properties within 60% by mole, preferably 40% by mole, of the whole amount of diamine.

Next, a synthesizing method of 2,2',6,6'-biphenyltetracarboxylic dianhydride which is a starting material of the high transparency polyimide precursor of the present invention and a synthesis method of the high transparency polyimide precursor will be hereinafter described in detail, however, the present invention is not limited thereto.

2,2',6,6'-biphenyltetracarboxylic dianhydride, which has the most basic structure among acid component materials, can be obtained by an oxidation reaction of pyrene. That is, firstly, pyrene is solved in dichloromethane. After solving the pyrene completely, acetonitrile and water are added and agitated. Sodium periodate as an oxidizer and ruthenium trichloride as a catalyst are added thereto followed by agitation for 10 to 30 hours at room temperature. After reaction, a precipitate is filtered. The precipitate is extracted with acetone followed by filtering. The acetone used for extraction is concentrated followed by drying, and refluxed by dichloromethane for 4 to 10 hours followed by filtering. The obtained white solid is 2,2',6,6'-biphenyltetracarboxylic acid, which is a precursor of 2,2',6,6'-biphenyltetracarboxylic dianhydride. After the obtained 2,2',6,6'-biphenyltetracarboxylic acid is refluxed with acetic anhydride for 3 hours, a solvent is distilled away. The obtained solid matter is refined by sublimation under the condition of 0.8 mmHg (106.4 Pa) pressure and 230° C., thus obtained a desired 2,2',6,6'-biphenyltetracarboxylic dianhydride.

Next, an example of synthesis of the polyimide precursor using the above-mentioned 2,2',6,6'-biphenyltetracarboxylic dianhydride as an acid component and 4,4'-diamino diphenyl ether as an amine component will be explained. First, equimolar 2,2',6,6'-biphenyltetracarboxylic dianhydride is gradually added to an organic polar solvent such as N-methylpyrrolidone or the like having 4,4'-diamino diphenyl ether solved while cooling followed by agitation caring that the temperature of the reaction solution will not rise. 2,2',6,6'-biphenyltetracarboxylic dianhydride generates heat when reacted with an amino compound more than pyromellitic dianhydride or 3,3',4,4'-biphenyltetracarboxylic dianhydride. This is presumed that since the reaction of 2,2',6,6'-biphenyltetracarboxylic dianhydride is good, proceeding of the reaction is fast. Hence, since an acid anhydride group is likely to react with moisture to be dicarboxylic acid, the reaction is preferably performed in dehydrated state in order to obtain a high molecular weight polyimide precursor.

If a temperature of the reaction solvent is as low as possible but not lower than the freezing point of the solvent, a high molecular weight polymer can be obtained. It is preferable that the temperature does not become 80° C. or more, particularly preferably 40° C. or more, during the reaction. It is also preferable to maintain the temperature at 10° C. or less in order to obtain a high molecular weight polymer having a molecular weight of 10,000 or more.

After about 1 to 20 hours of agitation while cooling, a reaction solution is dropped into agitated and dehydrated diethyl ether to reprecipitate, thereby, polyamic acid, which is a polyimide precursor, is obtained. The polyamic acid is again dissolved to an organic polar solvent such as N-methylpyrrolidone or the like and applied on a substrate such as a glass or the like to dry, thereby, a coating layer of polyamic acid is formed. Then, after heating, a coating layer of polyimide is obtained.

Also, in the case of performing a chemical imidization instead of the heating and dehydration, a conventional compound including amine such as pyridine, β-picolinic acid or the like, carbodiimide such as dicyclohexylcarbodiimide or the like, acid anhydride such as acetic anhydride or the like may be used as a dehydration catalyst. As the acid anhydride, there may be not only the acetic anhydride but also propionic anhydride, n-butyric anhydride, benzoic anhydride, trifluoroacetic anhydride or the like, but may not be particularly limited. Also, tertiary amine such as pyridine, β-picolinic acid or the like may be used together.

As for the polyimide precursor of the present invention as synthesized above, in order to make excellent original heat resistance and dimensional stability of polyimide finally obtained, it is preferable that a copolymerization ratio of an aromatic acid component and/or an aromatic amine component is as large as possible. Specifically, it is preferable that a ratio of the aromatic acid component with respect to an acid component constituting the repeating unit of the imide structure is 50% by mole or more, particularly 70% by mole or more. It is preferable that a ratio of the aromatic amine component with respect to the amine component constituting the repeating unit of the imide structure is 40% by mole or more, particularly 60% bymole or more. A wholly aromatic polyimide is particularly preferable.

From the viewpoint of attaining transparency, it is preferable that in the high transparency polyimide precursor of the present invention, 50% by mole or more, particularly 70% by mole or more, of the repeating unit of the polyimide precursor structure present in the polymer skeleton is the repeating unit represented by the formula (1a) or (1b). Also, from the viewpoint of heat resistance and dimensional stability, it is preferable that the repeating unit represented by the formula (1a) or (1b) is a repeating unit of the wholly aromatic polyimide precursor.

The polyimide precursor of the present invention synthesized as above has transparency even though the polyimide finally obtained is excellent in heat resistance or dimensional stability. A transmittance with respect to an electromagnetic wave of at least one wavelength selected from the group consisting of 436 nm, 405 nm, 365 nm, 248 nm and 193 nm is 20% or more, preferably 30%, more preferably 50% or more, particularly preferably 70% or more, when a film having a thickness of 1 μm is formed using the polymer precursor. In the polymer precursor of the present invention, each transmittance with respect to an electromagnetic wave of all wavelength including 436 nm, 405 nm and 365 nm is preferably 20% or more, more preferably 30% or more, further preferably 50% or more, particularly preferably 70% or more, when a film having a thickness of 1 μm is formed using the polymer precursor.

The effect of high transparency of the polyimide precursor of the present invention is more apparent when the film is thick. It is further preferable that a transmittance of the polymer precursor of the present invention is 20% or more, preferably 30% or more, more preferably 50% or more, with respect to an electromagnetic wave of at least one wavelength selected from the group consisting of 436 nm, 405 nm, 365 nm, 248 nm and 193 nm, desirably with respect to an electromagnetic wave of all wavelength of 436 nm, 405 nm and 365 nm, when a film having a thickness of 2 µm or more, specifically 3 µm, 5 µm or 10 µm, using the polymer precursor is formed.

Each of 436 nm, 405 nm and 365 nm is an emitting wavelength of a high-pressure mercury lamp, generally utilized for exposure of a photosensitive resin. Each of 248 nm and 193 nm is an emitting wavelength of a laser such as KrF, ArF or the like. High transmittance with respect to such a wavelength means that loss of light is small and a photosensitive resin composition having high sensitivity can be obtained.

Also, the polyimide finally obtainable from the high transparency polyimide precursor of the present invention has a high transparency. It is preferable that a light transmittance of each wavelength in a wavelength range between 400 nm and 800 nm is 85% or more when formed into a film having a thickness of 1 µm, preferably 2 µm. In the case that the polyimide obtainable as an end product is used for a film or the like requiring transparency in a visible light range, it is further preferable that a total light transmittance (JIS K7105) is 90% or more.

The weight average molecular weight of the polyimide precursor of the present invention is preferably, depending of the use, in the range of 3,000 to 1,000,000, more preferably 5,000 to 500,000, further preferably 10,000 to 500,000. If the weight average molecular weight is 3,000 or less, sufficient strength cannot be obtained when a coating layer or a film is made. Also, the strength of the film decreases when a heating treatment or the like is performed to obtain polyimide. If the weight average molecular weight is 10,000 or less, number of ends of polymers, which cause coloring, relatively increases, thereby coloring may be caused in polyimide to be obtained. On the other hand, if the weight average molecular weight exceeds 1,000,000, a viscosity increases and solubility declines, hence, it is hard to obtain a coating layer or a film having a smooth surface and a uniform thickness.

The molecular weight used herein means a polystyrene calibrated value by the gel permeation chromatography (GPC). The value may be of a molecular weight of the polyimide precursor itself or after a chemical imidization treatment by acetic anhydride or the like.

The polyimide precursor of the present invention has excellent storage stability since a reverse reaction is hard to proceed. Specifically, preferable storage stability is a rate of change of 20% or less, preferably 10% or less, more preferably 5% or less, in terms of the polystyrene calibrated-weight average molecular weight by the gel permeation chromatography of a 0.5 wt % solution of the polyimide precursor in N-methylpyrrolidone solvent substantially containing water after stored at 23° C. for 25 hours. Further, it is also preferable that rates of change is 20% or less, preferably 10% or less, more preferably 5% or less, in terms of the polystyrene calibrated-weight average molecular weight by the gel permeation chromatography of the 0.5 wt % solution after stored at 23° C. for 50 hours, 150 hours and 300 hours. Herein, "substantially containing water" means, as mentioned above, N-methylpyrrolidone is in a state without dehydration and a state in which a percentage of water content in N-methylpyrrolidone is 0.001 wt % to 10 wt %, further 0.005 wt % to 1 wt %.

The polyimide obtainable from the polyimide precursor of the present invention also keeps original properties of polyimide such as heat resistance, dimensional stability, insulation and the like, which are excellent. For example, a 5% reduction in weight temperature measured in nitrogen atmosphere of the polyimide obtainable from the polyimide precursor of the present invention is preferably 250° C. or more, more preferably 300° C. or more. Particularly, in the case that its use is an electronic part or the like, the production method of which includes a solder reflow process, if the 5% reduction in weight temperature is 300° C. or less, there is a risk that a defect such as a bubble or the like may occur due to a cracked gas generated in the solder reflow process. Herein, the 5% reduction in weight temperature means a temperature at which a weight of a sample is reduced by 5% of an initial weight (that is to say, a temperature at which the weight of the sample is reduced to 95% of the initial weight) when a weight decrement is measured by means of the thermogravimetric analyzer. Similarly, a 10% reduction in weight temperature means a temperature at which a weight of a sample is reduced by 10% of an initial weight.

Higher glass transition temperature of the polyimide obtainable from the polyimide precursor of the present invention is better from the viewpoint of heat resistance, however, if a use may include a thermoforming process such as an optical waveguide, a glass transition temperature is preferably about 120° C. to 380° C., more preferably about 200° C. to 380° C. Herein, the glass transition temperature in the present invention can be obtained from a peak temperature of tan δ (tan δ=loss elastic modulus (E")/storage elastic modulus (E')) by a dynamic viscoelasticity measurement. The dynamic viscoelasticity measurement can be conducted by, for example, a viscoelasticity analyzer (product name: Solid Analyzer RSA II, manufactured by Rheometric Scientific Inc.) at a frequency of 3 Hz and a heating rate of 5° C./min.

From the viewpoint of dimensional stability of polyimide obtainable from the polyimide precursor of the present invention, the coefficient of linear thermal expansion is preferably 70 ppm or less, more preferably 60 ppm or less, further preferably 40 ppm or less. In the case of using the polyimide precursor of the present invention for a semiconductor element or the like to form on a silicon wafer, the coefficient of linear thermal expansion is preferably 20 ppm or less from the viewpoint of adhesion property and warp of a substrate. Herein, the coefficient of linear thermal expansion in the present invention is a value measured by means of a thermo mechanical analysis device (for example, product name: Thermo Plus TMA8310, manufactured by Rigaku Corporation) under the condition of a heating rate of 10° C./min and a tensile load of 1 g/25,000 µm$^2$ so that a load per area of cross section of an evaluating sample is equal.

As aforementioned, the polyimide obtainable from the polyimide precursor of the present invention exhibits excellent transparency without introducing fluorine or an alicyclic structure. Hence, conventionally unavoidable problems due to the introduction of the fluorine or the alicyclic structure such as lowering of original physical properties of finally obtainable polyimide such as heat resistance, dimensional stability or the like, and rise of cost can be solved. Also, a coating layer, film or molded article of the polyimide having heat resistance equal to conventional aromatic polyimide can be obtained.

The polyamic acid, which is a precursor, of the present invention may be subject to a coating or molding process for producing a product or member as it is. Further, a polyimide precursor resin composition may be prepared by dissolving or dispersing the polyamic acid in a solvent if required and compounding a photo- or heat-curable component, a non-polymerizable binder resin other than the polyimide precursor of the present invention and other components.

As a solvent to dissolve, disperse or dilute the polyimide precursor resin composition, various general solvents may be used. Also, in the case of using the polyamic acid, which is a precursor, a solution obtained by a synthesizing reaction of polyamic acid may be used as it is and other components may be mixed therein, if necessary.

As a usable general solvent, for example, there may be ethers such as diethyl ether, tetrahydrofuran, dioxane, ethylene glycol dimethyl ether, ethylene glycol diethyl ether, propylene glycol dimethyl ether, propylene glycol diethyl ether or the like; glycol monoethers (that is, so called cellosolves) such as ethylene glycol monomethyl ether, ethylene glycol monoethyl ether, propylene glycol monomethyl ether, propylene glycol monoethyl ether, diethylene glycol monomethyl ether, diethylene glycol monoethyl ether or the like; ketones such as methyl ethyl ketone, acetone, methyl isobutyl ketone, cyclopentanone, cyclohexanone or the like; esters such as ethyl acetate, butyl acetate, n-propyl acetate, i-propyl acetate, n-butyl acetate, i-butyl acetate, acetic ester of the above-mentioned glycol monoethers (for example, methyl cellosolve acetate, ethyl cellosolve acetate), methoxypropyl acetate, ethoxypropyl acetate, dimethyl oxalate, methyl lactate, ethyl lactate or the like; alcohols such as ethanol, propanol, butanol, hexanol, cyclohexanol, ethylene glycol, diethylene glycol, glycerin or the like; halogenated hydrocarbons such as methylene chloride, 1,1-dichloroethane, 1,2-dichloroethylene, 1-chloropropane, 1-chlorobutane, 1-chloropentane, chlorobenzene, bromobenzene, o-dichlorobenzene, m-dichlorobenzene or the like; amides such as N,N-dimethylformamide, N,N-dimethylacetamide or the like; pyrrolidones such as N-methyl pyrrolidone or the like; lactones such as γ-butyrolactone or the like; sulfoxides such as dimethyl sulfoxide or the like, other organic polar solvents or the like. Moreover, there may be aromatic hydrocarbons such as benzene, toluene, xylene or the like and other organic nonpolar solvents or the like. These solvents can be used alone or in combination.

As a photocurable component, a compound having one or more ethylenically unsaturated bonds may be used. For example, there may be aromatic vinyl compounds such as an amide-based monomer, a (meth)acrylate monomer, an urethane (meth)acrylate oligomer, a polyester (meth)acrylate oligomer, epoxy (meth)acrylate, and (meth)acrylate containing a hydroxyl group, styrene or the like. Also, if the polyimide precursor has a carboxylic acid component such as polyamic acid or the like in its structure, a contrast of dissolving rate of an exposed portion and an unexposed portion becomes larger when and a photosensitive resin composition is made using an ethylenically unsaturated bond containing compound having a tertiary amino group in comparison with the case not using the same since an ionic bond is formed with carboxylic acid of the polyimide precursor. Herein, "(meth)acrylate" means either acrylate or methacrylate.

When using such a photocurable compound having an ethylenic unsaturated bond, a photoradical generator may be further added. As the photoradical initiator, there may be, for example, benzoin and alkyl ether thereof such as benzoin, benzoin methyl ether, benzoin ethyl ether, benzoin isopropyl ether or the like; acetophenone such as acetophenone, 2,2-dimethoxy-2-phenylacetophenone, 2,2-diethoxy-2-phenylacetophenone, 1,1-dichloroacetophenone, 1-hydroxyacetophenone, 1-hydroxycyclohexylphenyl ketone, 2-methyl-1-[4-(methylthio)phenyl]-2-morpholino-propane-1-one or the like; anthraquinone such as 2-methylanthraquinone, 2-ethylanthraquinone, 2-tertial-butylanthraquinone, 1-chloroanthraquinone, 2-amylanthraquinone or the like; thioxanthone such as 2,4-dimethylthioxanthone, 2,4-diethylthioxanthone, 2-chlorothioxanthone, 2,4-diisopropyl thioxanthone or the like; ketal such as acetophenonedimethylketal, benzyldimethylketal or the like; monoacylphosphineoxide or bisacylphosphineoxide such as 2,4,6-trimethylbenzoyldiphenylphosphineoxide or the like; benzophenones such as benzophenone or the like; xanthones or the like.

Also, even if tertiary amine such as N-phenyldiethanolamine, triethanolamine, triethylamine, N,N-diethylaminobenzene, diazabicyclooctane or the like is added to the polyimide precursor of the present invention, a charge transfer complex is formed with the polyimide precursor by absorption of ultraviolet ray, thus, solubility to a developer can be changed (K. K. NTS, *Latest polyimide*, P. 340-341, 2002).

Besides the above, photosensitivity may be imparted to the polyimide precursor itself by introducing a photosensitive portion to the polyimide precursor of the present invention.

Or, a resin composition may be prepared by adding a photosensitive component which generates acid or base by absorption of an electromagnetic wave or a photosensitive component which exhibits other effect by absorption of an electromagnetic wave, and introducing an indirect photosensitive portion which reacts by the effect of these photosensitive components to the polyimide precursor of the present invention.

As the compound generating acid by light, there may be a photosensitive diazoquinone compound having a 1,2-benzoquinonediazide or 1,2-naphthoquinonediazide structure, which is proposed in U.S. Pat. No. 2,772,972, U.S. Pat. No. 2,797,213 and U.S. Pat. No. 3,669,658. For example, there may be a phenol compound having naphthoquinonediazide sulfonate bonded as ester, an amino compound having naphthoquinonediazide sulfonate bonded as amide or the like. As the naphthoquinonediazide sulfonate, there may be 1,2-naphthoquinone-2-diazide-5-sulfonate and 1,2-naphthoquinone-2-diazide-4-sulfonate.

Specifically, for example, the following can be exemplified.

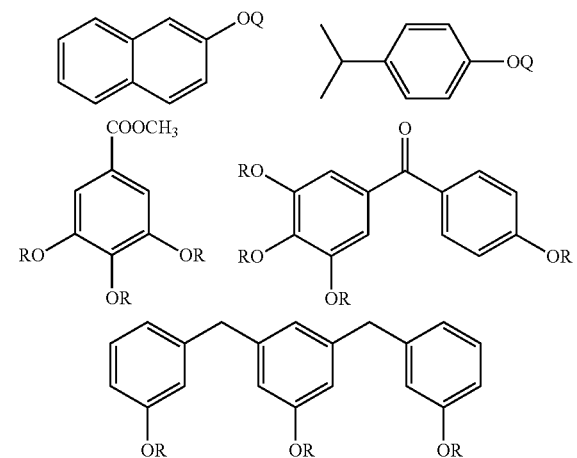

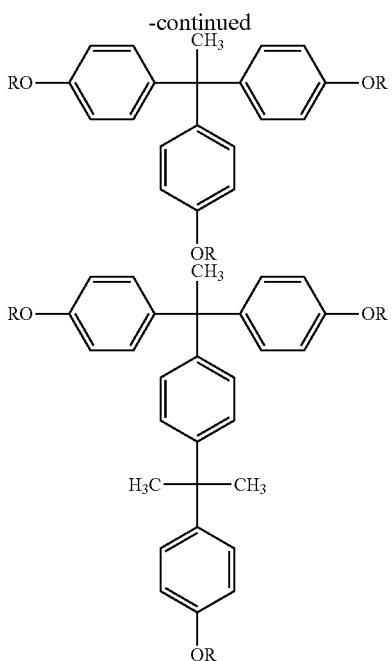

wherein, at least one of "R" is "Q" and the rest of "R" is a hydrogen atom.

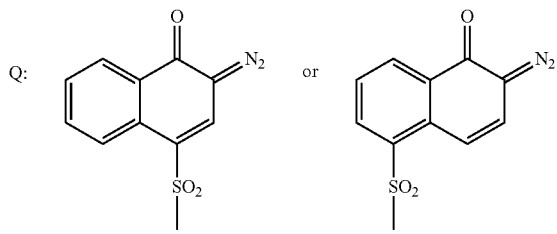

The compounding amount in the case of using such a photosensitive diazoquinone compound is preferably 0.5 to 50 parts by weight, more preferably 1 to 40 parts by weight with respect to 100 parts by weight of the polyimide precursor.

If the compounding amount is below 0.5 parts by weight, an excellent pattern cannot be obtained. If the compounding amount exceeds 40 parts by weight, physical properties of a layer of an obtained pattern or that with a heating treatment may decrease. Specifically, layer strength, heat resistance and flexibility are often declined. Further, decrease in layer thickness after a heating treatment becomes apparent.

Also, a conventional photoacid generator such as triazine and a derivative thereof, a sulfonate oxime ester compound, an iodonium sulfonate salt, a sulfonium sulfonate salt or the like can be used.

As a compound which generates base by light, there may be, for example, 2,6-dimethyl-3,5-dicyano-4-(2'-nitrophenyl)-1,4-dihydropyridine, 2,6-dimethyl-3,5-diacetyl-4-(2'-nitrophenyl)-1,4-dihydropyridine, 2,6-dimethyl-3,5-diacetyl-4-(2',4'-dinitrophenyl)-1,4-dihydropyridine or the like. When they are exposed to an active ray, a molecular structure changes through an intramolecular rearrangement to a structure having a pyridine skeleton so as to exhibits basicity. Then, after a heating treatment at 150° C. or more, imidization of the polyimide precursor proceeds and solubility decreases, thus, an excellent negative type pattern can be formed.

In order to impart a process property or various functionalities to the resin composition of the present invention, various organic or inorganic low molecules or polymer compounds may be also compounded besides the above. For example, dyes, surfactants, leveling agents, plasticizers, microparticles, sensitization agents or the like may be used. The microparticles may include organic microparticles such as polystyrene, polytetrafluoroethylene or the like, inorganic microparticles such as colloidal silica, carbon, phyllosilicate or the like, which may be porous or have a hollow structure. Examples of the function or form of these microparticles include pigments, fillers, fibers or the like.

The polyimide precursor resin composition of the present invention generally contains the polyimide precursor represented by the formula (1a) and/or (1b) in the range of 5 to 99.9 wt % with respect to the total amount of solids of the resin composition. Also, a compounding ratio of other optional components is preferably in the range of 0.1 wt % to 95 wt % with respect to the total amount of solids of the polyimide precursor resin composition. If the proportion is less than 0.1 wt %, it is difficult to exhibit the effect of the added additives whereas if the proportion exceeds 95% by weight, it is difficult to reflect the characteristics of the resin composition upon an end product. It is to be noted that the solid content of the polyimide precursor resin composition means the whole components other than solvents, and a liquid monomer component is included in the solid content.

The polyimide precursor resin composition of the present invention may be used in all known fields and products such as pattern-forming materials (resists), coating materials, paints, printing inks, adhesives, fillers, semiconductor elements, electronic materials, optical circuit parts, molding materials, resist materials, building materials, three-dimensional articles, optical members or the like.

Particularly, the polyimide precursor resin composition of the present invention has high sensitivity as absorption wavelength becomes shorter wavelength and can apply an electromagnetic wave having shorter wavelength which is conventionally not able to use besides original properties of polyimide to be finally obtained such as heat resistance, dimensional stability, insulation or the like, hence, a finer pattern can be formed.

As aforementioned, the polymer precursor of the present invention exhibits high transmittance in a shorter wavelength range with respect to an electromagnetic wave since absorption in a long wavelength range vanishes or becomes smaller by disconnecting or weakening a conjugated state, which is likely to be formed in the molecule of the precursor since the polymer precursor of the present invention has a part which sequences an unsaturated bond having a π electron orbit and a single bond alternately, due to a three-dimensional structure of the molecule.

Therefore, the polymer precursor of the present invention having a photosensitive portion introduced or a resin composition prepared by using the polymer precursor and a photosensitive component can be used as a photosensitive resin material which has high sensitivity and capable of exposure with an electromagnetic wave of a shorter wavelength.

According to the above methods, superior transparency can be obtained without declining useful properties in which the polymer compound, which is an end product, originally has in comparison with the case that a light absorption wavelength range becomes shorter wavelength by introducing other chemical structure or a substituent in the molecule.

Also, the high transparency polyimide precursor of the present invention exhibits excellent transparency without introducing fluorine or an alicyclic structure. Hence, the high transparency polyimide precursor of the present invention having the photosensitive portion introduced or a resin composition prepared by using the polymer precursor and the photosensitive component can be used as a photosensitive polyimide precursor or a photosensitive polyimide precursor resin composition which has high sensitivity.

Due to such a mechanism, transparency can be maintained with any kinds of diamine to react, and conventionally unavoidable problems due to the introduction of the fluorine or the alicyclic structure such as lowering of original physical properties of polyimide such as heat resistance, dimensional stability or the like, and rise of cost can be solved. Also, a coating layer, film or molded article of the polyimide having heat resistance equal to conventional aromatic polyimide can be obtained.

Also, the resin composition containing the polyimide precursor of the present invention has high sensitivity. The polyimide obtainable therefrom has heat resistance, dimensional stability and insulation, thus, it is suitable as a film or a coating layer for all member to which polyimide is applied conventionally. For example, the polyimide is expected to be utilized for semiconductor elements, optical circuit parts, electronic parts, display members for color filters or the like as a film, a structure or a coating layer having high heat resistance.

The present invention may not be limited to the above embodiments. The above embodiments are merely examples, and any one having substantially the same constitution and effect as the technical idea disclosed in the scope of the claims of the present invention is included in the technical scope of the present invention.

EXAMPLES

Production Example 1

A 2 L eggplant-shape flask was charged with 15 g (74 mmol) of pyrene and the pyrene was dissolved by dichloromethane of 320 ml. After the pyrene was completely dissolved, 320 ml of acetonitrile and 480 ml of distilled water were added and agitated. Thereto, 150 g of sodium periodate as an oxidant and 650 mg of ruthenium (III) chloride as a catalyst were added and agitated at ambient temperature for 22 hours. After reaction, a precipitate was filtrated, and the precipitate was extracted using acetone and filtrated. After the extracted acetone was condensed and dried, reflux was performed using dichloromethane for four hours followed by filtrating to obtain a powder. Until the powder was completely changed to a white color, the extraction using acetone and reflux using dichloromethane were repeated, thereby 10.2 g of 2,2',6,6'-biphenyltetracarboxylic acid was obtained.

The obtained 2,2',6,6'-biphenyltetracarboxylic acid was refluxed using acetic anhydride for three hours, and then the solvent was removed. The obtained solid substance was refined by sublimation under the condition of a pressure of 0.8 mmHg (106.4 Pa) and a temperature of 230° C., thereby a desired white powder of 2,2',6,6'-biphenyltetracarboxylic dianhydride (2,2',6,6'-BPDA) was obtained.

Example 1

A 50 ml three-neck flask was charged with 1.20 g (6 mmol) of 4,4'-diaminodiphenyl ether and the 4,4'-diaminodiphenyl ether was dissolved by 5 ml of N-methyl-2-pyrrolidone (NMP) dehydrated, then agitated under nitrogen flow while cooling the flask in an ice bath. Thereto, 1.77 g (6 mmol) of 2,2',6,6'-BPDA divided into 10 equal parts was added little by little every 30 minutes. After addition, the solution was agitated in an ice bath for 5 hours. The solvent was re-precipitated by dehydrated diethyl ether. The precipitate was dried for 17 hours at ambient temperature under reduced pressure. Thereby, 2.81 g of a white solid substance (Precursor 1) was obtained.

Example 2

A 50 ml eggplant-shape flask was charged with 400 mg of the precursor synthesized in Example 1 and 4 ml of NMP dehydrated and agitated. Thereto, 2 ml of acetic anhydride was added and agitated at 100° C. for 24 hours. The solution was re-precipitated using diethyl ether. Thereby, 370 mg of a white powder was obtained (Polyimide 1).

The weight average molecular weight with polystyrene standard using GPC (gel-permeation chromatography) was 64,000.

Example 3

A 50 ml eggplant-shape flask was charged with 400 mg of the precursor synthesized in Example 1 and 4 ml of NMP dehydrated, and agitated. Thereto, 2 ml of trifluoroacetic anhydride was added and agitated at 100° C. for 24 hours. The solution was re-precipitated using diethyl ether. Thereby, 370 mg of a white powder (Polyimide 2) was obtained. The weight average molecular weight with polystyrene standard using GPC was 13,000.

Example 4

400 mg of the precursor synthesized in Example 1 was dissolved in NMP dehydrated to be 15 wt %, spin coated directly on a glass, and dried on a hot plate heated to 140° C. for 30 minutes. Then, by heating at 300° C. for 1 hour in an oven under the air, polyimide (Polyimide 3) insoluble to NMP was obtained.

Example 6

A 50 ml three-neck flask was charged with 1.20 g (6 mmol) of 4,4'-diaminodiphenyl ether. The 4,4'-diaminodiphenyl ether was dissolved by 5 ml of N-methyl-2-pyrrolidone (NMP), and agitated under nitrogen flow at ambient temperature. Thereto, 1.77 g (6 mmol) of 2,2',6,6'-BPDA was added at a time. By addition, a large heat generation was observed. After addition, the solution was agitated for 5 hours and re-precipitated by diethyl ether dehydrated. Thereby, 2.12 g of a light brown powder (Precursor 2) was obtained.

Example 7

A 50 ml eggplant-shape flask was charged with 400 mg of the precursor synthesized in Example 1 and 4 ml of NMP dehydrated, and agitated. Thereto, 2 ml of acetic anhydride was added and agitated at 100° C. for 24 hours. The solution was re-precipitated using diethyl ether. Thereby, 350 mg of a light brown powder (Polyimide 4) was obtained. The weight average molecular weight with polystyrene standard using GPC was 6,800.

Example 8

A 100 ml three-neck flask was charged with 1.08 g (10 mmol) of paraphenylene diamine and the paraphenylene diamine was dissolved by 22.1 ml of N-methyl-2-pyrrolidone (NMP) dehydrated, then agitated under nitrogen flow while cooling the flask in an ice bath. Thereto, 2.94 g (10 mmol) of 2,2',6,6'-BPDA divided into 10 equal parts was added little by little every 30 minutes. After addition, the solution was agitated in an ice bath for 1 hour. The solvent was re-precipitated by dropping to 2 L of dehydrated diethyl ether. The precipitate was dried for 17 hours at ambient temperature under reduced pressure. Thereby, 2.91 g of a white solid substance (Precursor 3) was obtained.

Example 9

A 100 ml three-neck flask was charged with 2.92 g (10 mmol) of 1,4-bis(4-aminophenoxy)benzene and the 1,4-bis(4-anaminphenoxy)benzene was dissolved by 32.2 ml of N-methyl-2-pyrrolidone (NMP) dehydrated, then agitated under nitrogen flow while cooling the flask in an ice bath. Thereto, 2.94 g (10 mmol) of 2,2',6,6'-BPDA divided into 10 equal parts was added little by little every 30 minutes. After addition, the solution was agitated in an ice bath for 1 hour. The solvent was re-precipitated by dropping to 2 L of dehydrated diethyl ether. The precipitate was dried for 17 hours at ambient temperature under reduced pressure. Thereby, 5.78 g of a white solid substance (Precursor 4) was obtained.

Example 10

A 100 ml three-neck flask was charged with 2.92 g (10 mmol) of 1,3-bis(4-aminophenoxy)benzene and the 1,3-bis(4-aminophenoxy)benzene was dissolved by 32.2 ml of N-methyl-2-pyrrolidone (NMP) dehydrated, then agitated under nitrogen flow while cooling the flask in an ice bath. Thereto, 2.94 g (10 mmol) of 2,2',6,6'-BPDA divided into 10 equal parts was added little by little every 30 minutes. After addition, 5 ml of dehydrated NMP was added and the solution was agitated in an ice bath for 1 hour. The solvent was re-precipitated by dropping to 2 L of dehydrated diethyl ether. The precipitate was dried for 17 hours at ambient temperature under reduced pressure. Thereby, 5.61 g of a white solid substance (Precursor 5) was obtained.

Comparative Synthesis Example 1

A 100 ml three-neck flask was charged with 2.00 g (10 mmol) of diaminodiphenyl ether and the diaminodiphenyl ether was dissolved by 23.8 ml of N-methyl-2-pyrrolidone (NMP) dehydrated, then agitated under nitrogen flow while cooling the flask in an ice bath. Thereto, 2.18 g (10 mmol) of pyromellitic dianhydride divided into 10 equal parts was added little by little every 30 minutes. After addition, the solution was agitated in an ice bath for 1 hour. The solvent was re-precipitated by dropping to 2 L of dehydrated acetone. The precipitate was dried for 17 hours at ambient temperature under reduced pressure. Thereby, 3.99 g of a white solid substance (Comparative precursor 1) was obtained.

Comparative Synthesis Example 2

A 100 ml three-neck flask was charged with 2.00 g (10 mmol) of diaminodiphenyl ether and the diaminodiphenyl ether was dissolved by 28.0 ml of N-methyl-2-pyrrolidone (NMP) dehydrated, then agitated under nitrogen flow while cooling the flask in an ice bath. Thereto, 2.94 g (10 mmol) of 3,3',4,4'-BPDA divided into 10 equal parts was added little by little every 30 minutes. After addition, the solution was agitated in an ice bath for 1 hour. The solvent was re-precipitated by dropping to 2 L of acetone. The precipitate was dried for 17 hours at ambient temperature under reduced pressure. Thereby, 4.69 g of a white solid substance (Comparative precursor 2) was obtained.

[Structure of Polyimide Precursor]

Using DMSO-d$_3$ as a solvent, two-dimensional spectra of $^1$H-NMR, $^{13}$C-NMR and C—H of the Precursor 1 were measured by means of JN MLA400WB manufactured by JEOL Ltd. As a result, it was anticipated from signals of protons of aromatic series derived from 2,2',6,6'-BPDA that there were following two isomers, namely a trans isomer having amide bonds on different aromatic rings and a cis isomer having amide bonds on the same aromatic ring.

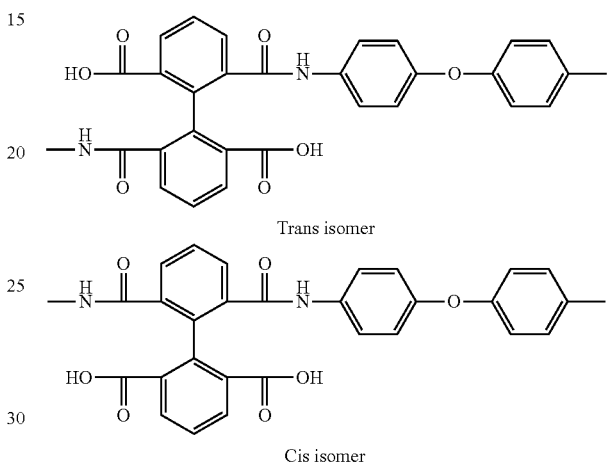

Trans isomer

Cis isomer

That is, it can be considered that the reaction of 2,2',6,6'-BPDA and diamine proceeds stepwise. When an amino group of diamine reacts with one acid anhydride group of 2,2',6,6'-BPDA, reactivity of two carbonyl groups of the other acid anhydride group changes whether the diamine is electron donating or electron attracting. If the amide bond produced by the reaction with the diamine is more electron attracting than carboxylic acid, electrophilicity of carbon of the carbonyl group which forms an acid anhydride group on the same aromatic ring as the amide group increases. As a result, the reactivity with the diamine increases so as to be the cis isomer. To the contrary, if carboxylic acid is more electron attracting than the amide bond produced, electrophilicity of carbon of the carbonyl group which forms an acid anhydride group on the same aromatic ring as the carboxylic acid increases. As a result, the reactivity of the diamine increases so as to be the trans isomer. Therefore, it seems that cis-trans can be controlled by adjusting an electronic state of the diamine.

[Evaluation of Transparency 1]

The 15 wt % NMP solvent of the Precursor 1 was spin coated on a glass to form a coating layer. A transmittance of the coating layer was measured by means of a spectrometer (product name: UV-2550 (PC) S GLP, manufactured by Shimadzu Corporation). The solvent of the Precursor 1 was spin coated, dried at 140° C. on a hot plate, thus obtained the coating layer of 15.9 μm.

Figure 2:
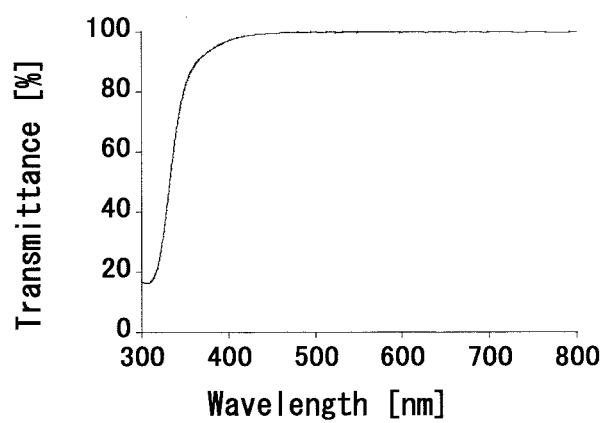
FIG. 2 is a graph showing the result of transmittance measured on a coating layer of Polyimide precursor 1 synthesized in Example.

As a result, as shown in FIG. 2, the transmittance was excellent such as 99% at 436 nm, 98% at 405 nm and 91% at 365 nm.

[Evaluation of Transparency 2]

Each of 20 wt % NMP solvents of the Precursors 1, 3, 4 and 5 and the Comparative precursors 1 and 2 was spin coated on a glass and heated on a hot plate at 100° C. for 10 minutes. Thereby, a coating layer having a mean thickness of 3.5 μm was obtained. The transmittance of the coating layer was measured by means of a spectrometer (product name: UV-2550 (PC) S GLP, manufactured by Shimadzu Corporation).

Figure 4:
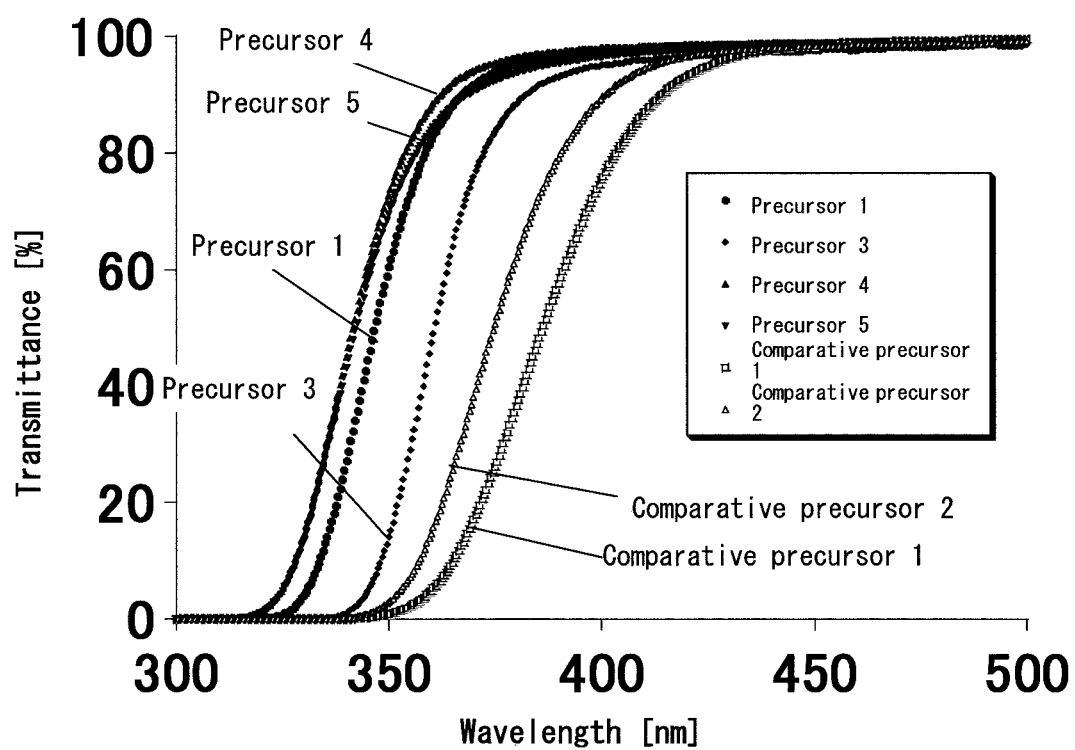
FIG. 4 is a graph showing the result of transmittance measured on each coating layer of Polyimide precursors 1, 3, 4 and 5 and Comparative precursors 1 and 2 synthesized in Example.

As a result, as shown in FIG. 4 and Table 1, the Precursors 1, 3, 4 and 5 exhibited excellent transmittance. To the contrary, the Comparative precursors 1 and 2 were particularly low in transmittance in low wavelength range.

TABLE 1

|  | Transmittance [%] | | |
| --- | --- | --- | --- |
|  | 436 nm | 405 nm | 365 nm |
| Precursor 1 | 98.7 | 97.9 | 88.3 |
| Precursor 3 | 97.3 | 95.6 | 64.1 |
| Precursor 4 | 98.8 | 98.1 | 91.9 |
| Precursor 5 | 98.1 | 97.0 | 88.1 |
| Comparative precursor 1 | 97.3 | 81.9 | 9.7 |
| Comparative precursor 2 | 98.0 | 92.4 | 25.5 |

Table 1 shows the results of measuring a layer having a thickness of 3.5 μm. Each transmittance of layers having a thickness of 1 μm and 10 μm was calculated using the results based on the Lambert-Beer Law as shown below. The calculated results are shown in Tables 2 and 3 respectively.

Specifically, according to the Lambert-Beer Law, a transmittance T is as follows:

$$\mathrm{Log}_{10}(1/T)=kcb$$

wherein, k=substance-specific constant number; c=concentration; and b=optical path.

In the case of a transmittance of a film, provided that density is constant even if a layer thickness changes, "c" is also a constant number. Thus, the above formula can be represented by the following formula using a constant number "f":

$$\mathrm{Log}_{10}(1/T)=fb$$

wherein, f=kc.

Herein, if a transmittance of a layer having a certain thickness is known, a substance-specific constant number "f" of each substance can be calculated. For example, the transmittance of the Precursor 3 is 64.1% at 365 nm when a layer thickness is 3.5 μm, thus, $\mathrm{Log}_{10}(1/0.641)=f \times 3.5$. The substance-specific constant number "f" of the precursor 3 at 365 nm can be calculated as 0.00552.

Hence, if a target layer thickness is assigned to "b" in the formula of $T=1/10^{0.00552 \cdot b}$, for example, in the case that the target layer thickness is 1 μm, if 1 is assigned to "b", the transmittance of the Precursor 3 at 365 nm when the target layer thickness is 1 μm can be calculated as T=0.882.

TABLE 2

Transmittance when layer thickness is 1 μm (calculated value)

|  | Transmittance [%] | | |
| --- | --- | --- | --- |
|  | 436 nm | 405 nm | 365 nm |
| Precursor 1 | 99.6 | 99.4 | 96.5 |
| Precursor 3 | 99.2 | 98.7 | 88.1 |
| Precursor 4 | 99.7 | 99.5 | 97.6 |
| Precursor 5 | 99.5 | 99.1 | 96.4 |
| Comparative precursor 1 | 99.2 | 94.5 | 51.3 |

TABLE 2-continued

Transmittance when layer thickness is 1 μm (calculated value)

|  | Transmittance [%] | | |
| --- | --- | --- | --- |
|  | 436 nm | 405 nm | 365 nm |
| Comparative precursor 2 | 99.4 | 97.8 | 67.6 |

TABLE 3

Transmittance when layer thickness is 10 μm (calculated value)

|  | Transmittance [%] | | |
| --- | --- | --- | --- |
|  | 436 nm | 405 nm | 365 nm |
| Precursor 1 | 96.3 | 94.1 | 70.1 |
| Precursor 3 | 92.5 | 87.9 | 28.1 |
| Precursor 4 | 96.6 | 94.7 | 78.6 |
| Precursor 5 | 94.7 | 91.7 | 69.6 |
| Comparative precursor 1 | 92.5 | 56.5 | 0.1 |
| Comparative precursor 2 | 94.4 | 79.8 | 2.0 |

[Evaluation of Storage Stability]

The change in molecular weight of a prepared 0.5 wt % NMP solution of each Precursor 1, 3, 4 and 5 when stored at 23° C. was measured. In the experiment, only the Precursor 1 used a sample synthesized under the condition that the amounts of starting material and the solvent, used equipments and the like are doubled in scale than those disclosed in Example 1. The results of molecular weight change are showing in Table 4.

The NMP used for preparing the solvent is a normal one and not dehydrated.

The measurement conditions are as follows:
Equipment: HLC-8120 GPC system, manufactured by Tosoh Corporation;
Column: TSK gels α–M×2;
Solvents: NMP dissolving lithium bromide and phosphoric acid respectively by the concentration of 0.03 mol/L;
Temperature: 40° C.; and
Flow rate: 500 μl/min.

TABLE 4

Change in weight average molecular weight of the polyimide precursor of the present invention

|  | 0 hr | 25 hrs | 50 hrs | 150 hrs | 300 hrs |
| --- | --- | --- | --- | --- | --- |
| Precursor 1 | 42000 | 41000 | 42100 | 42100 | 41000 |
| Precursor 3 | 27900 | 28900 | 28900 | 29200 | 27500 |
| Precursor 4 | 43700 | 43400 | 44900 | 44500 | 44000 |
| Precursor 5 | 81900 | 76800 | 78700 | 78000 | 81500 |

In the similar manner, the change in molecular weight of each of the Comparative precursors 1 and 2 was measured. However, the column of GPC (the gel permeation chromatography) used for measuring the molecular weight was clogged and the measurement was unable to conduct. According to the document disclosed in the past (J. A. Kreuz, J. Polym. Sci.; Part A; Polym. Chem. 1990 28 3787), the weight average molecular weight of a compound corresponding to the Comparative compound 1 is initially 106,000 and becomes 69,000 after 25 hours under nearly the same condition. Also, the weight average molecular weight of a compound corresponding to the Comparative compound 2 is initially 90,100 and is reduced to 61,200.

From the above results, the polyimide precursor of the present invention exhibits stable weight average molecular weight during storage. It can be understood that the structure of the polyimide precursor of the present invention is effective against decrease in molecular weight during storage at room temperature, which is a problem of a normal polyamic acid.

[Evaluation of Thermophysical Properties 1]

An NMP solvent of the Polyimide 1 was coated on a film (product name: UPILEX S 50S, manufactured by Ube Industries, Ltd.) attached on a glass. After drying at 140° C. on a hot plate for 30 minutes, peeling was performed, thus obtained a film having a thickness of 5 μm. Similarly, a 15 wt % NMP solvent of the Precursor 1 was coated on a film (product name: UPILEX S 50S, manufactured by Ube Industries, Ltd.) attached on a glass. After drying at 140° C. on a hot plate for 30 minutes followed by peeling, the peeled film was heated at 300° C. in an oven in the air for 1 hour, thus obtained a polyimide film having a thickness of 45 μm (Polyimide 3).

(Evaluation of Dynamic Viscoelasticity)

A dynamic viscoelasticity measurement of each film was conducted by means of a viscoelasticity analyzer (product name: Solid Analyzer RSA II, manufactured by Rheometric Scientific Inc.) at a frequency of 3 Hz and a heating rate of 5° C./min.

Figure 3A:
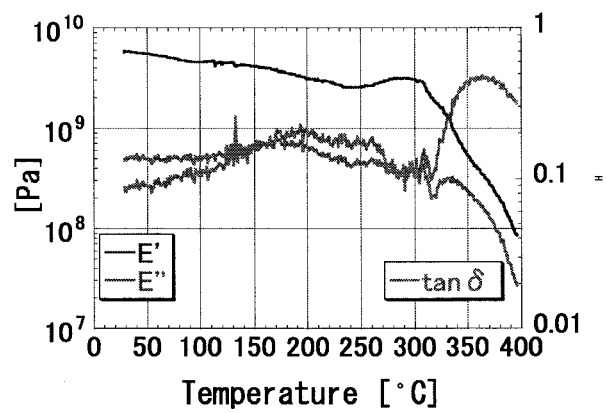
FIG. 3A is a graph showing the result of a dynamic viscoelasticity measurement on a film of Polyimide 1 synthesized in Example.
Figure 3B:
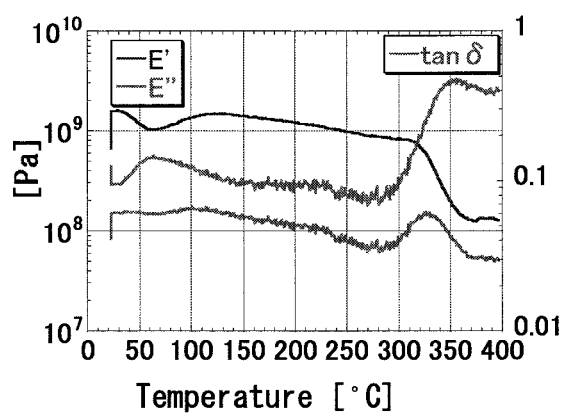
FIG. 3B is a graph showing the result of a dynamic viscoelasticity measurement on a film of Polyimide 3 synthesized in Example.

As a result, as shown in FIGS. 3A and 3B, since each of the films has a peak of tan δ at around 350° C., the Tg (glass transition temperature) of each polyimide is 350° C. Also, since the Polyimide 1 is in a rubbery region (a region wherein E' and E" are constant) at a temperature higher tan Tg in view of behavior of storage elastic modulus (E') and loss elastic modulus (E") at a temperature higher than Tg, the observation suggests that the Polyimide 1 is a crosslinked product. Since E' and E" keeps on decreasing at a temperature higher than Tg, the observation suggests that the Polyimide 3 is not a crosslinked product. Thereby, the polyimide formed by the polyimide precursor of the present invention is excellent in heat resistance.

(Evaluation of Coefficient of Linear Thermal Expansion)

Each of the above film was cut into width of 5 mm×length of 20 mm to be used as an evaluation sample. A coefficient of linear thermal expansion was measured by means of a thermo mechanical analysis device (product name: Thermo Plus TMA8310, manufactured by Rigaku Corporation). The measurement condition of the evaluation samples was an observed length of 15 mm, a heating rate of 10° C./min, and a tensile load of 1 g/25000 μm² so that a load per area of cross section of the evaluation sample is equal. The coefficient of linear thermal expansion of the Polyimide 1 was measured with a tensile load of 1 g and the coefficient of linear thermal expansion of the Polyimide 3 was measured with a tensile load of 5 g.

As a result, the coefficient of linear thermal expansion at 50° C. to 100° C. of the Polyimide 1 was 27 ppm and that of the Polyimide 3 was 25 ppm. A flexion point of expansion of the film of each polyimide was 315° C.

[Evaluation of Thermophysical Properties 2]

The 20 wt % NMP solvent of each of the Precursors 3, 4 and 5 was spin coated on a glass. After drying at 100° C. for 10 minutes, the temperature was raised from room temperature to 300° C. at a rate of 10° C./min. in nitrogen atmosphere. Then, 300° C. was maintained for 1 hour, thus obtained Polyimide films 3a, 4a and 5a (thickness of 10±1.5 μm).

The dynamic viscoelasticity evaluation and the coefficient of linear thermal expansion evaluation of each film were performed under the similar condition as above (tensile load was 2 g). Tg and the coefficient of linear thermal expansion were measured. The results are shown in Table 5.

TABLE 5

| Thermophysical properties of polyimide film of the present invention | | |
|---|---|---|
|  | Tg | Coefficient of linear thermal expansion |
| Polyimide film 3a | >400° C. | 25.5 |
| Polyimide film 4a | 345° C. | 50.6 |
| Polyimide film 5a | 315° C. | 61.6 |

Example 11

A photosensitive resin composition (Photosensitive resin composition 1) was prepared by adding and dissolving the Precursor 5 and the following photosensitive substance by 20 wt % with respect to the Precursor 5 in NMP so that a solid content is 20 wt %:

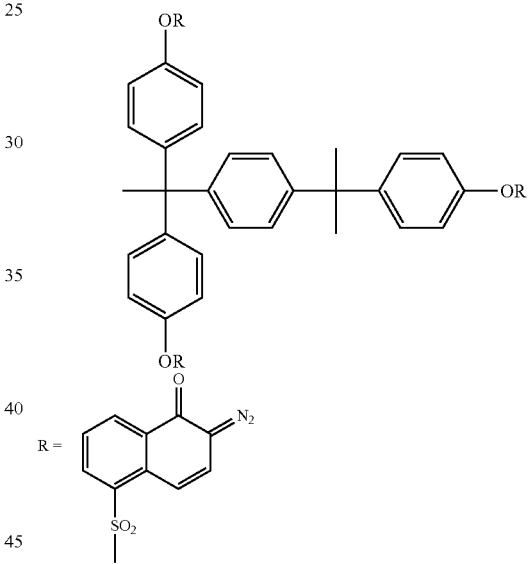

[Evaluation of Photosensitivity]

The Photosensitive resin composition 1 was spin coated on chrominium of a chrominium plated glass, and dried on a hot plate at 100° C. for 10 minutes. In this way, two kinds of coating layer respectively having a thickness of 1.25 μm and 2.8 μm were obtained.

Each of the coating layers was exposed by means of a manual exposure equipment (MA-1200, manufactured by Dainippon Screen Mfg. Co., Ltd.). Only 365 nm light was taken from light from a high-pressure mercury lamp using an i-ray pass filter and used for the exposure.

The exposure was conducted by various exposures. After each coating layer was dipped in a 0.1 wt % TMAH aqueous solution for 30 seconds while slowly being stirred by means of a magnetic stirrer, each coating layer was dipped in distilled water for 10 seconds to rinse off. A relationship between a standardized layer thickness after drying and exposures was plotted to obtain sensitivity.

Figure 5:
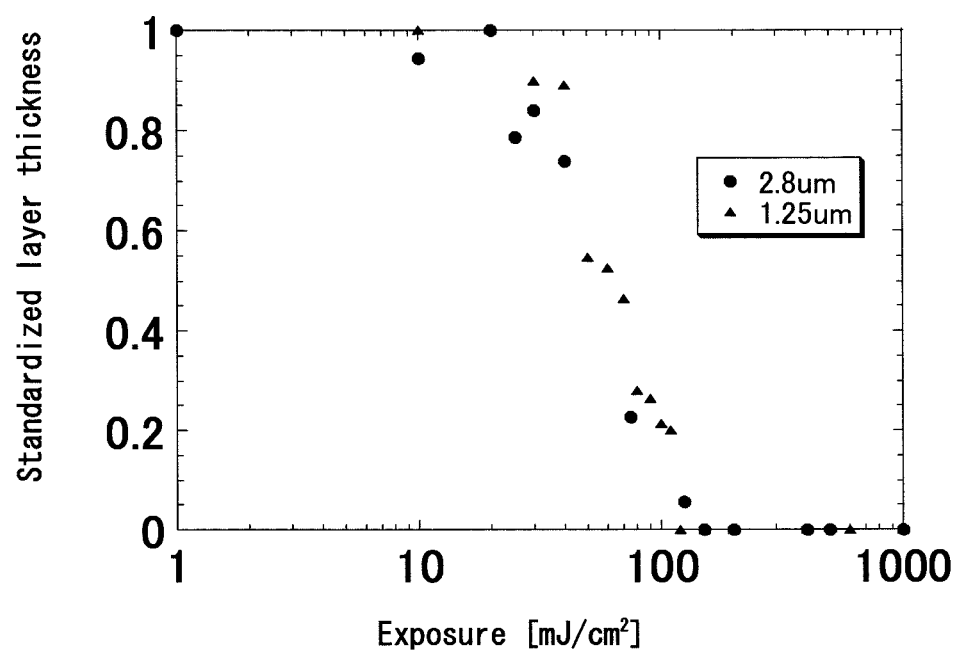
FIG. 5 is a graph showing the result of sensitivity measured on Photosensitive resin composition 1 synthesized in Example.

As a result, the sensitivity was significantly excellent, wherein the remaining layer was 0 at 120 mJ/cm² when a layer thickness was 2.8 μm and at 110 mJ/cm² when a layer thickness was 1.25 μm as shown in FIG. 5. These results were obtained because the photosensitive substance was able to utilize light from the light source efficiently since the transmittance of the precursor was excellent.

[Pattern Forming]

Furthermore, the Photosensitive resin composition 1 was used to form a pattern.

In the same manner as the evaluation of the photosensitivity, after a coating layer having a thickness of 2 μm was formed followed by irradiation with an electromagnetic wave only of 150 mJ/cm² and 365 nm via a photomask, the coating layer was dipped in a 0.1 wt % TMAH aqueous solution for 30 seconds while slowly being stirred by means of a magnetic stirrer. Then, the coating layer was dipped in distilled water for 10 seconds to rinse off followed by drying.

The layer sample was heated in an oven at 300° C. in nitrogen atmosphere for 1 hour. A pattern was confirmed by means of a microscope.

Figure 6:
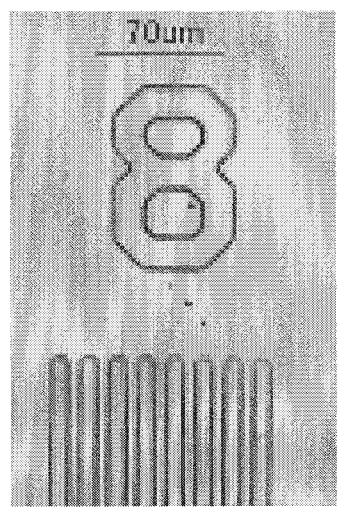
FIG. 6 is an opotical photomicrograph showing resolution of Photosensitive resin composition 1 synthesized in Example showing resolution.

As a result, as shown in FIG. 6, the pattern was resolved to 8 μm/8 μm line and space. The layer thickness after baking was 1.1 μm.

Also, a coating layer of the Photosensitive resin composition 1 coated on a glass in the same manner as above was heated at 300° C. in nitrogen atmosphere for 1 hour. The coating layer was dipped in distilled water for 24 hours and peeled from the glass, thus a film having a thickness of 10 μm was obtained. As the result of the dynamic viscoelasticity evaluation and the thermo mechanical analysis, Tg was 350° C. and a coefficient of linear thermal expansion was 63.9 ppm.

In comparison with the data of the Precursor 5 before exposure, the coefficient of linear thermal expansion was larger by just under 2 ppm, however, Tg increased. It is presumed that this is due to the effect that the Photosensitive substance 1 becomes a high reactive substance such as carbene or the like when decomposes by heat and becomes a crosslinked portion of a polymer chain or the like.

According to these results, as the polyimide formed by the polyimide precursor of the present invention has excellent heat resistance and capable of producing a film having a low coefficient of expansion, the polyimide is suitable for forming products of fields in which these characteristics are advantageous, for example, paints, printing inks, color filters, flexible displays, electronic parts, layer insulation films, wire cover films, optical circuits, optical circuit parts, antireflection films, holograms, other optical members or building materials.

Also, since the polyimide precursor of the present invention is excellent in storage stability and transmittability of an electromagnetic wave, a photosensitive resin composition high in sensitivity and excellent in storage stability can be obtained when the polyimide precursor of the present invention is applied to the photosensitive resin composition.

The invention claimed is:

1. A polyimide precursor resin composition containing a high transparency polyimide precursor and a photosensitive diazoquinone compound, the polyimide precursor consisting of repeating units represented by the following formula (3), wherein a rate of change in term of the polystyrene calibrated-weight average molecular weight by gel permeation chromatography of a 0.5 wt % solution of the polyimide precursor in N-methylpyrrolidone solvent substantially containing water is 20% or less after being stored at 23° C. for 25 hours:

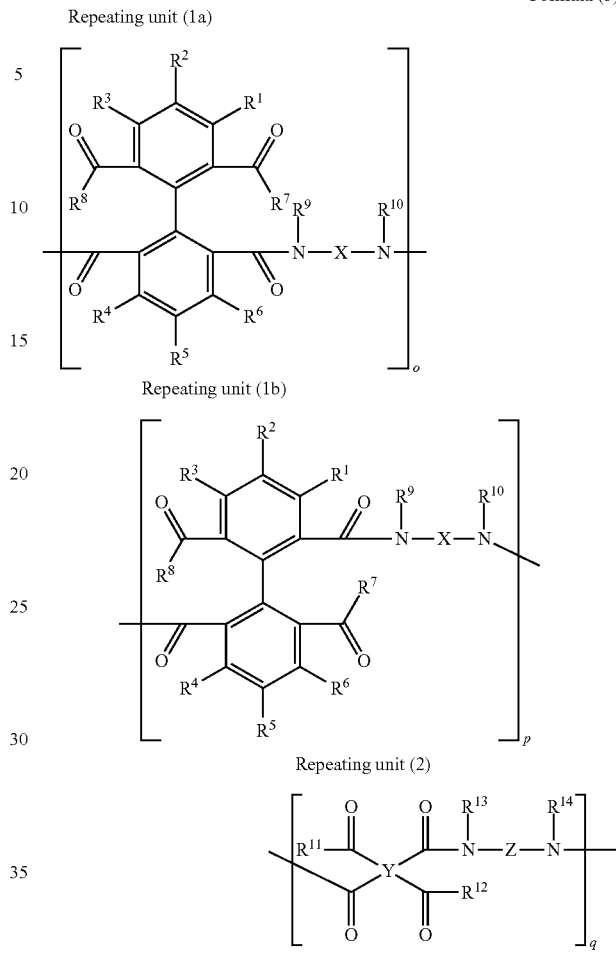

Formula (3)

wherein each of $R^1$ to $R^6$ is independently a hydrogen atom or a monovalent organic group, which may be bonded to each other; each of $R^7$, $R^8$, $R^{11}$ and $R^{12}$ is independently a hydrogen atom, a halogen atom, a hydroxyl group, a mercapto group, a cyano group, a silyl group, a silanol group, an alkoxy group, a nitro group, a carboxyl group, an acetyl group, an acetoxy group, a sulfo group, a saturated or unsaturated alkyl group, a saturated or unsaturated halogenated alkyl group, an aromatic group, an allyl group or an ethylenically unsaturated bond-containing group; X is a divalent organic group having an aromatic ring; each of $R^9$, $R^{13}$ and $R^{14}$ is independently a hydrogen atom or a monovalent organic group; Y is a tetravalent organic group; Z is a divalent organic group having an aromatic ring; groups represented by the same symbol among repeating units in the same molecule may be different atoms or structures; and at least one of o and p is a natural number of 1 or more, and o, p and q are natural numbers of 0 or more, and further wherein a total amount of the repeating units (1a) and (1b) in the formula (3) is 50% by mole or more of repeating units constituting a polymer skeleton of the high transparency polyimide precursor.

2. A polyimide precursor resin composition according to claim 1, wherein the high transparency polyimide precursor has a photosensitive portion which cures the polyimide precursor resin composition or changes solubility of the polyimide precursor resin composition when irradiated with radiation having a wavelength of 440 nm or less in a molecule; and/or the polyimide precursor resin composition further contains a photosensitive component having the photosensitive portion.

3. A polyimide precursor resin composition according to claim 1, wherein the polyimide precursor resin composition is used as a pattern forming material.

4. A polyimide precursor resin composition according to claim 1, wherein the polyimide precursor resin composition is used as a paint or a printing ink; or a forming material of color filters, flexible display films, electronic parts, layer insulation films, wire cover films, optical circuits, optical circuit parts, antireflection films, holograms, optical members or building materials.

* * * * *